US008009966B2

(12) United States Patent
Bloom et al.

(10) Patent No.: US 8,009,966 B2
(45) Date of Patent: Aug. 30, 2011

(54) METHODS AND APPARATUS FOR USE IN SOUND REPLACEMENT WITH AUTOMATIC SYNCHRONIZATION TO IMAGES

(75) Inventors: Phillip Jeffrey Bloom, Epsom (GB); William John Ellwood, Eastbourne (GB)

(73) Assignee: Synchro Arts Limited, Epson, Surrey (GB)

( * ) Notice: Subject to any disclaimer, the term of this patent is extended or adjusted under 35 U.S.C. 154(b) by 2205 days.

(21) Appl. No.: 10/695,596

(22) Filed: Oct. 28, 2003

(65) Prior Publication Data

US 2005/0042591 A1     Feb. 24, 2005

Related U.S. Application Data

(60) Provisional application No. 60/423,055, filed on Nov. 1, 2002, provisional application No. 60/424,427, filed on Nov. 7, 2002.

(51) Int. Cl.
*G11B 27/00* (2006.01)
*G10L 19/00* (2006.01)
*G10L 15/26* (2006.01)

(52) U.S. Cl. ......... 386/285; 386/287; 704/216; 704/235

(58) Field of Classification Search .................... 386/39, 386/96, 54, 66; 704/214, 216, 236
See application file for complete search history.

(56) References Cited

U.S. PATENT DOCUMENTS

| | | | |
|---|---|---|---|
| 3,743,391 A | 7/1973 | White | 352/5 |
| 4,479,150 A * | 10/1984 | Ilmer et al. | 386/39 |
| 4,591,928 A | 5/1986 | Bloom et al. | 360/13 |
| 4,839,733 A | 6/1989 | Karamon et al. | 358/341 |
| 5,111,409 A | 5/1992 | Gasper et al. | 395/152 |
| 5,553,864 A | 9/1996 | Sitrick | 463/31 |
| 5,613,909 A | 3/1997 | Stelovsky | 463/1 |
| 5,634,020 A | 5/1997 | Norton | 395/339 |

(Continued)

FOREIGN PATENT DOCUMENTS

CA    2129925    2/1996

(Continued)

OTHER PUBLICATIONS

D. Mellor, "WordFit Automatic Dialogue Synchronisation," *Audio Media*, Mar. 1991, 4 pages in length.

(Continued)

*Primary Examiner* — Peter-Anthony Pappas
*Assistant Examiner* — Gelek Topgyal
(74) *Attorney, Agent, or Firm* — Fredrikson & Byron, PA

(57) ABSTRACT

Digital audio and video files are created corresponding to selected scenes from a creative production and are provided with a processing system that enables dialog to be selected from a scene and replaced by a user's dialog which is automatically synchronized with the original dialog so as to be in synchronism with lip movements displayed by the accompanying video display. The processing further includes a graphical user interface that presents the user with the video, the text of the dialog, and cues for rehearsal and recording of replacement dialog by the user. Replay of the user's dialog is accompanied by the video and part of the original audio except that the original dialog corresponding to the user's dialog is muted so that the user's dialog is heard as a replacement. Singing or other sounds associated with visible action may also be replaced by the same processes.

25 Claims, 13 Drawing Sheets

U.S. PATENT DOCUMENTS

| | | | |
|---|---|---|---|
| 5,649,060 A | 7/1997 | Ellozy et al. | 395/2.87 |
| 5,782,692 A | 7/1998 | Stelovsky | 463/1 |
| 5,809,454 A * | 9/1998 | Okada et al. | 704/214 |
| 6,034,679 A | 3/2000 | McGrath | 345/328 |
| 6,151,441 A | 11/2000 | Kawamura et al. | 386/95 |
| 6,166,731 A | 12/2000 | Duvall et al. | 345/328 |
| 6,185,538 B1 | 2/2001 | Schulz | 704/278 |
| 6,260,011 B1 | 7/2001 | Heckerman et al. | 704/235 |
| 6,283,760 B1 * | 9/2001 | Wakamoto | 434/156 |
| 6,352,432 B1 | 3/2002 | Tsai et al. | 434/307 A |
| 6,425,825 B1 | 7/2002 | Sitrick | 463/31 |
| 6,469,711 B2 | 10/2002 | Foreman et al. | 345/723 |
| 6,535,269 B2 | 3/2003 | Sherman et al. | 352/6 |
| 6,661,496 B2 | 12/2003 | Sherman et al. | 352/6 |
| 6,816,858 B1 * | 11/2004 | Coden et al. | 707/5 |
| 7,165,029 B2 * | 1/2007 | Nefian | 704/236 |
| 7,243,062 B2 * | 7/2007 | Wark | 704/214 |
| 7,424,204 B2 * | 9/2008 | Nakamura | 386/95 |
| 2002/0031334 A1 * | 3/2002 | Tanizawa et al. | 386/54 |

FOREIGN PATENT DOCUMENTS

| | | |
|---|---|---|
| EP | 0 372 155 | 5/1989 |
| EP | 0 877 378 A2 | 11/1998 |
| FR | 2 730 582 | 8/1996 |
| FR | 2 765 354 | 12/1998 |
| FR | 2 814 888 | 4/2002 |
| GB | 2 101 795 A | 7/1982 |
| GB | 2 117 168 A | 3/1983 |
| GB | 2 235 815 A | 3/1991 |
| WO | WO 95/12274 | 5/1995 |
| WO | WO 97/43020 | 11/1997 |
| WO | WO 98/38642 | 9/1998 |
| WO | WO 01/95631 A2 | 12/2001 |
| WO | WO 03/023765 A1 | 3/2003 |

OTHER PUBLICATIONS

P.J. Bloom et al., "A Digital Signal Processing System for Automatic Dialogue Post-Synchronization," *SMPTE Journal*, Jun. 1984, pp. 566-569.

Brochure, by Digital Audio Research (DAR), entitled "Soundstation II," published 1990, 8 pages in length.

Brochure, by Digital Audio Research (DAR), entitled "Soundstation II Digital Audio Disk Recorder and Production Centre for Film & Video Post Production Applications," published 1990, 2 pages in length duplexed.

Brochure, by Digital Audio Research (DAR), entitled "Soundstation II Digital Audio Disk Recorder and Production Centre for Multitrack Music & CD Editing Applications," published 1990, 2 pages in length duplexed.

\* cited by examiner

Figure 11 – Time Alignment Processing

METHODS AND APPARATUS FOR USE IN SOUND REPLACEMENT WITH AUTOMATIC SYNCHRONIZATION TO IMAGES

The present application claims the priority of Provisional Application 60/423,055 filed Nov. 1, 2002, and Provisional Application 60/424,427 filed Nov. 7, 2002, the disclosures of which are incorporated herein by reference in their entirety.

FIELD OF THE INVENTION

The present invention relates to methods and apparatus for use in sound replacement with automatic synchronization to images, and more particularly to a method and apparatus for replacing original actors' or singers' voices in digitized film or video with a replacement lip-synced version created automatically from a user's recording of the dialog or singing.

BACKGROUND OF THE INVENTION

Computer systems that support the playback of synchronized digital audio with digital video as digital movies from data stored on either fixed or removable disks, or downloaded over the Internet as streaming media are well known. In addition, computers with a sound card are generally capable of recording sound input from a microphone. Computer systems with "full duplex" sound cards are capable of recording sound input whilst simultaneously playing back sound and video signals from a pre-recorded computer video and audio file.

In FIG. 1 of the accompanying drawings a conventional computer system 100 is shown which consists of a computer 110 with a CPU (Central Processing Unit) 112, RAM (Random Access Memory) 118, user interface hardware typically including a pointing device 120 such as a mouse, a keyboard 125, and a display screen 130, an internal storage device 140 such as a hard disk or further RAM, a device 160 for accessing data on fixed or removable storage media 165 such as a CD ROM or DVD ROM, and optionally a modem or network interface 170 to provide access to the Internet 175. The pointing device 120 controls the position of a displayed screen cursor (not shown) and the selection of functions displayed on the screen 130.

The computer 110 may be any conventional home or business computer such as a PC or Apple Macintosh, or alternatively one of the latest dedicated "games machine" such as a Microsoft® XbOX™ or Sony Playstation 2™ with the pointing device 120 then being a game controller device. Some components shown in FIG. 1 may be absent from a particular games machine. FIG. 2 illustrates software that may be installed in the computer 110.

In the following descriptions, the term "mouse" and "clicking" will be used for convenience as generic terms for a screen cursor control device and screen object selection operation.

A user may obtain from a CD ROM, the Internet, or other means, a digital data file 115 containing an audio and video clip which, for example, could be in a common format such as the avi or QuickTime® movie format and which is, for example, copied and stored on the hard disk 140 or into RAM. The computer 110 has a known operating system 135 such as that provided by any of the available versions of Microsoft® Windows® or Mac® OS, audio software and hardware in the form of a sound card 150 or equivalent hardware on the computers mother board, containing an ADC (Analogue to Digital Converter) to which is connected a microphone 159 for recording and containing a DAC (Digital to Analogue Converter) to which is connected one or more loudspeakers 156 for playing back audio. As illustrated in FIG. 2, such an operating system 135 generally is shipped with audio recording and editing software 180 that supports audio recording via the sound card 150 and editing functions, such as the "Sound Recorder" application program shipped with Windows®. The recording program can use sound card 150 to convert an incoming analog audio signal into digital audio data and record that data in a computer file on the hard disk drive 140. Audio/video player software 190, such as Windows Media Player shipped with Windows®, is used for playing composite digital video and audio files or just audio files through the sound card 150, further built-in video hardware and software, the display screen 130 and the speakers 156. Composite video and audio files consist of video data and one or more parallel synchronized tracks of audio data. Alternatively, audio data may be held as separate files allocated to store multiple streams of audio data. The audio data may be voice data such as dialog or singing, instrumental music, or "sound effects", or any combination of these three types.

Most current games systems do not provide facilities to make sound recordings. However, even with these facilities, a user would be unable to synchronize and replace the audio signal in the composite video and audio file in a simple manner with audio data recorded on the hard disc.

There also exist commercially-available computer-based digital audio and video editing programs which can be installed in a conventional computer system such as the system 100 and provide the functions of both the Audio Recording and Editing Software 180 and the Audio/Video Player Software 190. Representative examples of such programs are Digidesign's Pro Tools® system, Sound Forge® program from Sony Pictures Digital, or Syntrillium Software Corporation's Cool Edit Pro (now Adobe Audition from Adobe Systems Incorporated). These known editing programs enable a skilled user to import a digital composite audio-video file into the editing program, play the video track and original dialog signals, and optionally play any music and sound effects tracks at the same time together.

With sufficient practice, the skilled user can enable and execute the recording of a new voice at the same time as playing the video track alone. The new audio data produced by this recording can be played back with the video track by the editing program, but with the timing achieved when it was recorded with the video playback. Before doing so, typically, the user must manually mute the original dialog track on the file and enable the new dialog track to play.

It is well known that it is difficult for an actor to perform an exact repetition of a line of dialog in sufficient synchronization with a pre-recorded video representation of the line being spoken, and that an audio track recorded in such circumstances is very unlikely to have its start and detailed acoustic properties synchronized with those of the original audio track.

Synchronization requires a further step of manually editing the detail of the waveform of the newly recorded audio or of obtaining, configuring and applying specialised automatic audio synchronization software, such as that described in GB2117168 and U.S. Pat. No. 4,591,928 (Bloom et al), to create a third audio signal providing a new, aligned audio track. However, even in the latter case, the skilled user must perform the further steps of muting the original audio signal and enabling the new aligned track. To view the final combination of new synchronized audio with the video, the user must control the start of playback of the editing program to ensure its playback starts before the new audio recording and stops at the end. This procedure is painstakingly complex and time-consuming, requires skills and specialist knowledge, and must be repeated for each audio sequence being replaced, for example each line in a video or song. Each of the final selected synchronized recordings must be manually selected and playback enabled, whilst disabling playback of the original or intermediate recordings, in the editing program in order to play back an entire scene with the new recordings. If there are several alternative recordings, typically kept on different tracks in the editing program, the selected one of each of these must be manually moved to a further track or tracks to enable non-interrupted playback of the selected edited and synchronized audio recordings. Furthermore, the user must enable the playback of the original audio in the sections where there is no replacement audio—or where the user has chosen to select the original audio instead of a replacement. Lastly, to achieve the desired objective there must be a means for switching between the multiple desired sources and mixing all of these selected signals with the original background audio, and feeding this mix to the audio output system while the video is played back in sync with the audio.

Even in a professional studio equipped to provide specialised automatic dialog replacement and synchronization services for the film or video industry, most of the above manual procedures must take place, and there is no generally convenient method of selecting a sequence of a plurality of the desired synchronized replacement recordings and playing these back in sequence with the video and, when a replacement recording is not selected, playing the original audio instead.

There exists a need for a system which is capable of creating automatically, for an audio/video programme with existing dialog or singing, a series of new audio recordings replacing the original audio recordings, the new audio recordings being those selected by a user from edited versions of the users recordings synchronized with the video.

It is an object of the present invention to provide, for example, a computer program which runs on a PC or games system and provides simple and immediate means to create and play a digital video simultaneously with user-selected replacement voice recordings which have been automatically edited and sequenced to playback with accurate lip-synchronization with the images in the digital video. To provide the required simplicity, the program firstly should be a single integrated program, rather than having multiple components that its user needs to obtain separately and then assemble together, and secondly should employ familiar and simple controls. To provide further simplicity, there should be an automatic means for indicating to the user when to record the replacement signal and for providing visual cues to the timing of the main acoustical events such as words. It is a further object to provide an end user with means for: a) creating a new replacement audio signal by automatically editing a newly recorded audio signal to synchronize its main acoustic features to the corresponding features in the original pre-recorded audio signal; b) selecting automatically the correct new replacement audio signals; c) automatically switching to and playing the selected new signals at the right times with the digital video; and d) playing any desired background audio such as a music backing or sound effects track in sync with the video. In other words, there should be no need for the end user to manipulate the video and audio signals other than having to take the steps of: selecting the clip of interest in the video programme; operating a few simple and familiar controls to select and optionally rehearse the lines from a part or all of this clip; recording the replacement audio for that section; and playing the selected section or the entire clip of the audio video programme with the automatically edited and synchronized replacement audio clip or clips.

SUMMARY OF THE INVENTION

According to a first aspect of the invention there is provided apparatus for processing audio data, comprising means for deriving from audio data feature data representative of audible time-varying acoustic features of the audio data; means for comparing first feature data derived from first audio data synchronously associated with video data with second feature data derived from second audio data and determining timing differences between the first and second feature data; means for editing the second audio data in dependence upon said timing difference such as to provide edited second audio data in a synchronous relation to said first audio data; and means for synchronously outputting said video data and said edited second audio data while muting said first audio data.

According to a second aspect of the invention there is provided apparatus for processing audio data, comprising means for deriving from audio data feature data representative of audible time-varying acoustic features of the audio data; means for selecting from data representing synchronously streamable video and audio data data representing a portion of a stream of the streamable data and measuring durations of and intervals containing audible time-varying acoustic features of the audio data; and means for populating a database with data and measurements provided by said selecting and measuring means.

This apparatus may further comprise means for populating said database with text related to said data and measurements provided by said selecting and measuring means.

Audio and video data processing software according to the invention in one aspect comprises a feature analysis program adapted to derive from audio data feature data representative of audible time-varying acoustic features of the audio data; a comparison and timing program adapted to compare first feature data derived from first audio data synchronously associated with video data with second feature data derived from second audio data and to determine timing differences between the first and second feature data; an editing program adapted to edit the second audio data in dependence upon said timing differences such as to provide edited second audio data in a synchronous relation to said first audio data; and a streaming program adapted to synchronously output said video data and said edited second audio data while muting said first audio data.

Audio and video data processing software according to another aspect of the invention comprises a feature analysis program adapted to derive from audio data feature data representative of audible time-varying acoustic features of the audio data; a selection and measuring program adapted to select from data representing synchronously streamable video and audio data data representing a portion of a stream of the streamable data and to measure durations of and intervals containing audible time-varying acoustic features of the audio data; and a database program adapted to populate a database with data and measurements provided by said selection and measuring program.

Said database program may further be adapted to enable population of said database with text related to said data and measurements provided by said selection and measuring program.

The invention also provides apparatus for processing audio and video data, comprising means for selecting from data representing synchronously streamable video and audio data scene data representing a portion of a stream of the streamable data and measuring durations of and intervals containing audible time-varying acoustic features of audio data within said data; and means for populating a database with scene data and measurements provided by said selecting and measuring means.

The apparatus may further comprise means for populating said database with text related to said scene data and measurements, and means for populating said database with still data representative of static video data extractable from said scene data.

The invention yet further provides audio and video data processing software comprising a selection and measuring program adapted to select from data representing synchronously streamable video and audio data scene data representing a portion of a stream of the streamable data and to measure duration of an intervals containing audible time-varying acoustic features of audio data within said scene data; and a database program adapted to populate a database with scene data and measurements provided by said selection and measuring program. The said audio and video data processing software may be such that said database program is further adapted to populate said database with text related to said scene data and measurements; and said database program is further adapted to populate said database with still data representative of static video data extractable from said scene data.

The invention also provides a method of processing audio data comprising the steps of deriving from first audio data first feature data representative of audible time-varying acoustic features of the first audio data; deriving from second audio data second feature data representative of audible time-varying acoustic features of the second audio data; comparing said first and second feature data and determining timing differences between the first and second feature data; editing the second audio data in dependence upon said timing differences such as to provide edited second audio data having a synchronous relation to said first audio data; and outputting synchronously said edited second audio data with video data having a synchronous relation to said first audio data, while muting said first audio data.

Furthermore, the invention provides a method of processing audio data, comprising the steps of selecting from data representing synchronously streamable video and audio data scene data representing a portion of a stream of the streamable data; measuring durations of and intervals containing audible time-varying acoustic features of the audio data; and populating a database with scene data and measurements selected from and measured in the scene data.

The method may include deriving from the audio data in the scene data feature data representative of audible time-varying acoustic features of the audio data; and populating the database with said feature data; creating text data related to said scene data and measurements and populating said database with said text data; and extracting still data representative of static video data from said scene data, and populating said database with said still data.

In a preferred embodiment of the invention, graphical user interface software comprises a video and graphics display program adapted to control a display screen to display moving pictures in response to a stream of video data and to display a plurality of graphically defined control areas on said screen; a control module adapted to detect selection of a said control area by coincidence of cursor positioning and actuation of a pointing device and to generate respective control signals in response to such selection; and an output program adapted to respond to said control signals by outputting selected synchronized streams of video data and audio data, and to record an input audio stream provided during the said synchronized streams.

According to another aspect of the present invention there is provided a method and apparatus that enables an unskilled user firstly to make digital recordings of their voice whilst watching a digital video clip containing a performer speaking or singing. Once the user recording is made, the apparatus processes the user's voice recording to create a new digital audio signal that has been automatically edited to make its main acoustic features align with those in the performer's voice. Lastly when the user instructs the apparatus to play back the digital video clip with the aligned user's voice instead of the original performer's, the user's voice is heard accurately lip-synced with the original video to create a convincing impression that the character in the video is speaking or singing with the user's voice.

In relation to this aspect of the invention there is disclosed herein a method and apparatus for providing untrained users an easy-to-use means to replace any of one or more voice tracks, originally lip-synced to performers in a digital video clip, with a recording of a user's own voice that, during or after recording, is automatically processed and edited such that in a subsequent playback phase utilising the user's edited recording and the original video clip played without the original voice track, the main time-varying audio features of the edited user's recording align accurately in time with corresponding features in the muted original voice track and, hence, are seen to be substantially accurately lip-synced with the video image of the corresponding performer. This method of voice recording, aligning and playing the aligned replacement voice accurately synchronized to the original performer during playback of the video while muting the voice track of the original performer will be referred to herein as revoicing. The present invention thus provides a system for allowing a non-skilled user to very easily and rapidly replace sections of a digital audio signal, that accompanies a digital video signal, with their own voice. In this system, a user records his voice and this recording is automatically edited so that the timing of a substantial proportion of its time-varying features align in time with the same features of the original audio signal it is to replace. During the final stage of playback of the video after recording and processing the new voice recording, the edited audio recording is played at the appropriate time with the video instead of the original audio and substantially maintains synchronization with the video by virtue of having been edited and positioned to match the original audio.

The method disclosed in one embodiment of this invention provides for as many as three sets of apparatus or systems. The first is a PC-based system providing a skilled media editor the means to select and prepare manually media data and other related data. The second is a system in which the selected media data and other related data are combined with a computer program to create a multi-media product that can be transferred to and run in the PC of the end user. This end-user PC is the third system, which, together with the multi-media product created in the second system, provides a user with the means to carry out the revoicing functions. The first two systems can be the same PC.

The user's revoicing system in the present embodiment utilizes a conventional personal computer with microphone input and audio and video output. Means are provided for an unskilled user to operate a revoicing program via a graphical user interface and a pointing device with a few simple controls implemented in the graphical user interface for carrying out a voice replacement task and to achieve lip-synced results. An advantage of this system is that it provides the means to insulate the end user from the complexity of the audio manipulation and data processing taking place in the revoicing system.

Alternatively, some or all of the media preparation steps may be automated by applying appropriate known computer-based signal and data processing techniques. In further embodiments, the media preparation phase could alternatively be replaced by processing which is wholly or partly carried out in the end user's system.

In a preferred embodiment of this invention, means are provided in the user's revoicing system for the user to play back selected sequences of multiple revoiced lines with each processed user recording being successively played in accurate sync with the video, with the system muting the original voice when a user's recording is selected for playback and, otherwise, playing the performer's original voice. Further means are provided for playing back overlapping user's processed recordings when required as well as playing back the original background audio or music tracks that accompanied the original voices.

This invention has the advantage that all of the functionality the end user requires is provided in a single, integrated computer-based system with a few simple controls. Hitherto, methods for creating synchronized voice replacement were only available via the operation of several complicated audio editing and processing programs by a skilled operator carrying out sequences of many complex and lengthy operations to achieve similar results.

The main steps in the process of media preparation in a preferred embodiment are:
1) Digitization of the desired original audio and video source material clips into digital composite video and audio media files and entering these media files into a computer;
2) Selection of the Scenes, Lines, characters and words within the digitized clips that will be made available to the end user for dialog replacement and creating digital video files which contain the required media for each Scene;
3) Creation of, if not already existing, separate digital audio signal files that contain original dialog signal to be replaced and/or data representative of the dialog signal's time varying feature data in a form suitable for a time-alignment algorithm to process; and
4) Creation of media-related data files containing data including transcribed selected text as well as data relating to and descriptive of the timing and other features of the words, Lines, Scenes and data indicating the location of the audio and video data.

The next stage of the creation of an end-user computer program that accesses and uses the digital media files, pre-processed signals and associated data, and provides the user interface and processing functionality outlined above and described in more detail below. This program, combined with the edited media data and the media related data can be transferred to and run in a computer-based processing system such as a home multi-media PC and provides the end user with the simple-to-use integrated system for revoicing the lines of original dialog with his own voice or other users' voices.

In a preferred embodiment of this invention, means are provided in the end user's system for the end user to control and/or initiate, via a graphical user interface, the following main operational steps and functions (the execution of which need not necessarily be in the sequence given):
1. Optionally select a Scene or Scenes to revoice from a digital audio/video programme (such as a clip from a film showing actors speaking lip-sync dialog).
2. Select a Line or Lines to revoice from a digital audio/video programme.
3. Optionally select Characters to revoice.
4. Optionally Rehearse a selected Line or Lines while seeing the video and hearing the Original character's audio.
5. Record the user's voice speaking the selected Line or Lines (or alternative words) having been given visual cu s for when to start speaking and when to say the original words or sounds in each Line. Following or during Recording, without the end user's intervention, the system automatically processes and edits the end user's Recorded Line to create a revoiced version whose time-varying features are aligned to those of the original Character's audio and hence, when played in sync with the corresponding original Video, will generally be heard in synchronization with the Character's visible corresponding lip movements in the Video. The automatic audio synchronization and editing can be implemented via an algorithm such as that described in GB2117168 and U.S. Pat. No. 4,591,928.
6. Play back the end user's selected revoiced Lines synchronized to the original video. The revoiced audio is heard instead of the original dialog, which is muted by the system during the playback.
7. Optionally select which of multiple audio user recordings for each line should be played during Playback.
8. Optionally Play entire Scenes with multiple selected Lines, having selected either the end user's recordings or optionally the Original dialog recordings.

Optionally the system will automatically also play back, in sync with the video and revoiced audio, the corresponding background music and effects audio tracks during the playback of end user's lines in order to recreate respectively the musical accompaniment or acoustic atmosphere of the Original audio/video clip.

In accordance with further embodiments of this invention, sequences with multiple lines can be recorded, and the present invention allows the edited replacement recording lines to overlap when required and still be played back at the correct time in the correct sequence. If some of the lines are not recorded, the system reverts to playing the original ones of those audio lines at the correct time.

Although as an example of this invention there is described herein a method and apparatus for replacing dialog in digital video film clips, it will be apparent to one skilled in the art that the present invention can be applied to replace singing voices in music videos, and to replace sound effects and other non-verbal sounds which have a time-coincident corresponding visual event in the video or film clips. In addition, a system embodying this invention may be used by professional sound engineers to create replacement recordings more rapidly and efficiently than currently possible with general-purpose consumer and professional digital audio editing systems.

In a further embodiment, means are also provided for continuous alignment processing while the end user records his voice until he chooses to stop recording, after which he can review what has been synchronized, and then resume recording from any point in the program with continuous processing occurring. In such further embodiment means are also provided for the system to playback all such arbitrarily recorded and processed takes in the correct order and position in time.

In addition, it should be apparent that methods in accordance with the invention can be applied to audio/video signals which are streamed across the internet, with the audio processing taking place in one server, or split to allow some of the tasks to take place on the server and some on the user's PC.

Also, methods in accordance with the invention can be applied to run in multiple parallel streams in order to allow a number of users to be separately but simultaneously recorded and processed. This would allow, for example, harmony parts to be synchronized and played back simultaneously.

In addition, methods in accordance with the invention can be applied to allow the end user's voice to be continuously recorded, processed and played back in a single pass instead of separate Record and Play passes. This can be achieved while recording by simply introducing a delay into the play back of the processed end user's voice through a second audio and video playback system in which the video output screen displays an equally delayed and synchronized second stream of the video media. For example the delayed processed audio and delayed video signals can be transmitted to be heard and seen by an audience remote from the end user. The delay required must be long enough to allow the end user's voice(s) to be recorded and processed into synchronization with the delayed original video program stream.

In a further embodiment, all or parts of the step (2) given previously as part of media preparation can be carried out by the end-user and all or parts of the steps (3) and (4) can be programmed and automated to take place in the end-user program using known speech recognition and audio and image signal processing techniques. The parts of steps (3) and (4) not taking place in the end-user program can taken place on other computer systems, for example on an Internet server.

In a further embodiment, the markup of the dialog text, the inclusion of it as data, and its output with karaoke-style highlighting to guide the user does not have to take place in order to provide the revoicing functionality. While this may be less convenient and may cause the user to memorize the original dialog, it is a feasible approach.

Other objects, features and advantages of the present invention will be apparent from the accompanying drawings and from the detailed description which follows.

Although the method and apparatus described here is one example, one skilled in the art will recognise that other methods and apparatus can be implemented in accordance with the invention which is defined in the claims hereinafter.

DESCRIPTION OF THE PREFERRED EMBODIMENTS

According to the present embodiment of this invention, to provide simple operation for the end user, there are data preparation steps which can, in one example, be made by skilled editors who prepare and organise the original audio and video data as well as create auxiliary data such as data files describing the text and timing of the words in the original dialog audio for which an end user may wish to record a replacement. Such auxiliary text timing data is used to provide cues to the end user as to what to say and when to say it during rehearse and recording passes.

In other embodiments such preparation could be performed automatically by a combination of speech recognition systems with computerised timing measurements and automatic generation of a database of results.

In further embodiments, the audio being replaced need not be limited to speech. The principles and processes of the invention can be applied to replacing singing, musical instruments and sound effects.

Description of User Interface and Operation

Figure 3:
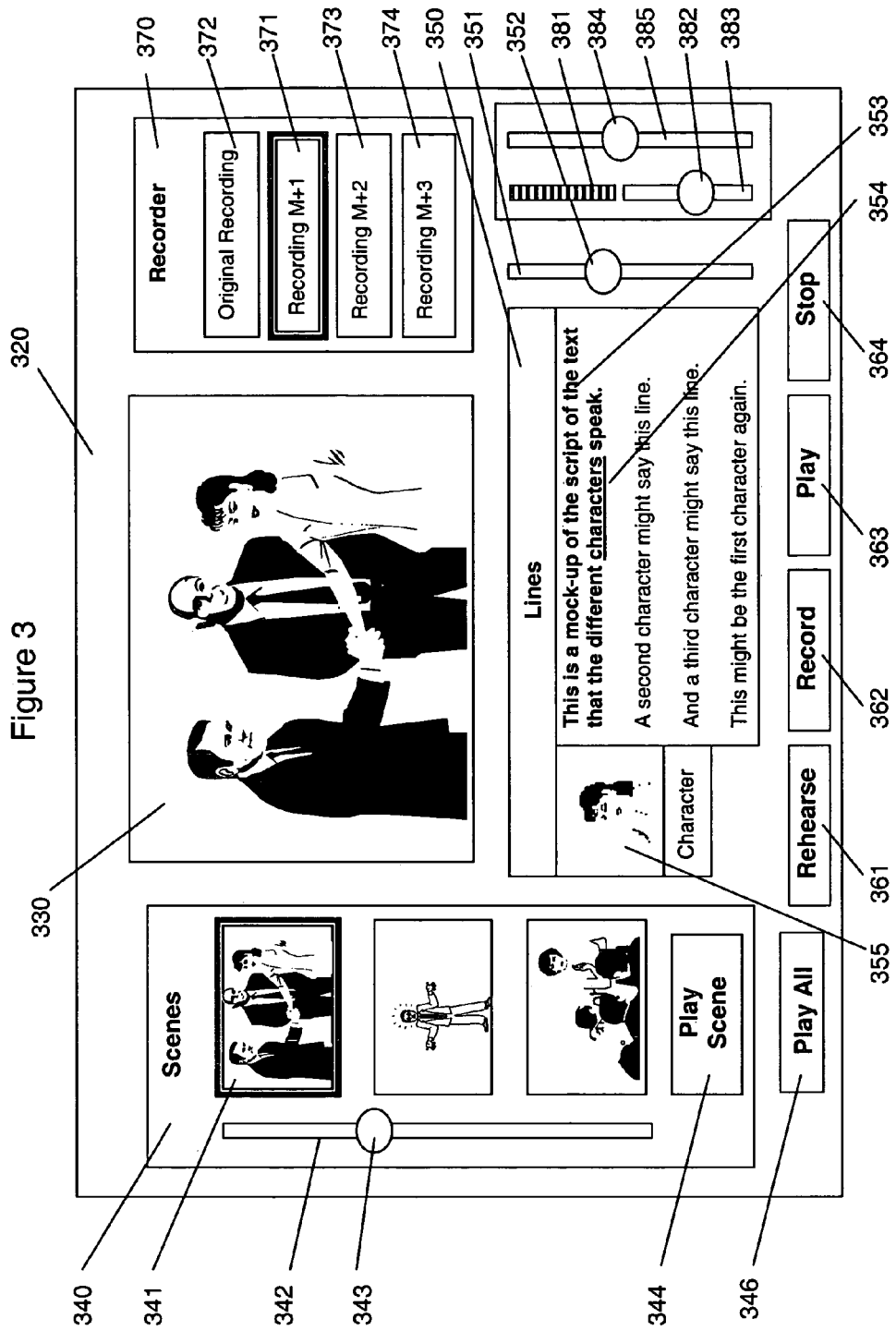
FIG. 3 is an example of a graphical user interface with controls that the revoicing system application software presents on a PC monitor to the unskilled system end user according to one embodiment of the present invention.

FIG. 3 is a schematic diagram illustrating one example of a graphical user interface which includes basic controls required to operate the revoicing system for digitized film or video clips. A similar interface can be used for replacing singing or sound effects, with the names given to various controls and screen areas changed to suit the industry terms normally associated in describing elements of the type of content being replaced.

Solely for convenience, the following defined terms will be used in the description.

A Programme (as distinct from a computer program) is a collection of Scenes from one or more digital video and audio titles e.g. from single or multiple film or TV productions. The Scenes may be from contiguous or non-contiguous sections of the production.

A Scene is several consecutive lines of dialog spoken by one or more characters.

A Line is a sequence of consecutive words that are spoken or sounds that are uttered by one character in a Scene. Sounds or words that are not made by the same character can overlap parts of a Line.

A Digital Video file is a digitized and typically compressed version of the video content that, when played with the original audio files, reconstructs a Scene from a Programme in its original form. Typical compressed audio/video file formats are represented by .avi or .mov extensions in computer systems.

An Original Recording is a digitally stored version of a character's utterance, whether speech or other character action related sound, that is being replaced in the Digital Video and corresponds to a Line.

A R v iced Take (or simply Take) is the result of the end user initiating a recording operation, recording his/her speech or other sounds through a microphone into computer storage, and the stored digital audio being edited automatically according to instructions from a time alignment algorithm to match substantially the time varying features of the Original Recording.

Revoicing—the operation of recording and automatically time aligning a user's voice to convincingly replace the original voice in a Programme.

In the following description reference will be made to the computer system 100 of FIG. 1 as modified to embody one aspect of the present invention by software produced by a first system embodying a second aspect of the invention.

A graphical user interface 320 as it appears on the display screen 130 in this embodiment is shown in FIG. 3. The interface 320 is divided into five main areas:
a Scene display and selection area 340; a main video display window 330; a Line display and selection window 350; Line operation buttons 361 through 363; a Stop button 364 and a Revoiced Take display and selector or Recorder section 370, which is labelled "Recorder" for the end user. Only the main video display window 330 does not serve as a control. The Recorder section 370 indicates the available user Revoiced Takes, such as 371, 373 and 374 and the Original Recording 372. The pointing device 120 is used to position a cursor (not shown) on and to select and operate (e.g. if a mouse, by clicking) any of the controls shown in ways to be described below.

The user can operate the interface controls in any order, but a typical initial sequence would be as follows:

Firstly, the user would select a Scene to work with or review by selecting in the Scene selection area 340. To select the Scene, the user clicks on the small window showing a still image 341 from that Scene. The heavy border around the image 341 indicates that the associated Scene is selected. Alternatively the user can drag a Scene selector slider control 343 up and down with the device 120 within the boundaries of a slider 342, to select from all the Scenes available. When a Scene is selected, the user sees a still image from that Scene displayed in the main video display window 330.

If the user clicks a second time on the selected Scene window, the modified computer system 100 plays the digital video file of that Scene to provide the video display in the Video window 330 and plays back the original audio through the computer's audio system 150 and speakers 156. Each Scene typically extends over one or more Lines of dialog for one or more characters. At the same time, the text of the Lines of dialog for that Scene is displayed in the Line display and selection window 350.

Secondly, the user can select a Line from that Scene in the Line selector window, 350 by clicking on any visible line of text. The currently selected Line, in this example, Line 353, is shown selected by being highlighted (which is represented in FIG. 3 by the bold text). The user can bring non-visible Lines into the Line selector window for selection by dragging the Line selector control 352 within the boundaries of the slider control 351. When a Line is selected, an image of the Character who speaks the Line in the original audio/video track is shown in a Character window 355, with the character name (optionally) shown below the image for further identification.

Thirdly, once the user has selected a Scene and Line he wishes to revoice, he can play the selected Line with the video and original characters recorded voice by clicking on the Rehearse button 361. When the user clicks on the Rehearse button 361, the video and the original audio begin to play at a point a short time before the beginning of the chosen Line. To give the user an accurate indication of when the first word starts and, more importantly, when to start speaking during the recording phase, the computer system automatically generates and presents graphically within the interface 320, a sequential countdown of the numbers "3", "2", "1", and the word "GO". The successive countdown images are separated by an equal time period (such as 0.75 seconds) and are timed such that "GO" appears at the instant before the first word (or sound) in the selected Line's dialog starts. A further guide to the timing of words and sounds as they occur in the selected Line is given by the system showing the displayed words in the window 350 with additional highlighting (represented by underlining 354). The additional highlighting of a word occurs at the time that word is encountered in the original audio track (whether or not that original audio signal is being played and heard). The additional highlighting of a word in the line lasts for the duration of that word in the audio track. This gives the user a running visual guide to the timing of the events in the line during both the Rehearse phase and in the Record phase to be described next. In the Rehearse phase, the video and the original audio stop playing a short time after the end of the Line.

Fourthly, when the user is ready to record his performance of the selected Line, he clicks on the Record button 362. When the user clicks on the Record button 362, the video and the original audio begin to play at the same point a short time before the beginning of the chosen Line, as in the Rehearse phase. The system again, as in the Rehearse mode, provides the user with a visual graphic countdown to indicate when to start speaking and also display the moving additional highlighting of words in the window 350 as they occur in the Original Recording. During the recording phase, however, the original dialog track audio is not played through the loudspeaker 156 so the microphone 159 does not pick it up. The original dialog audio can be played as an audible guide, however, through headphones (not shown) which the user may wear. To provide further cues and the right audio ambience, the original music and sound effects track and/or the original characters' voice(s) which occur before (but not during) the selected Line starts are played through the loudspeaker 156 during the Record phase.

Consequently, if, during the Record phase, the user follows the countdown to start speaking, starts speaking at "GO" and then follows the timing of the highlighted words, this will help create a recording with words and vocal sounds that have similar timing to, but are not precisely in time with, those in the Original Recording.

In the current example, the digital recording thus made by the user is stored temporarily on the hard disk 140 or into RAM 118, and that audio data will be processed and edited automatically using, for example, a method according to U.S. Pat. No. 4,591,928 to create and store a processed i.e. revoiced, audio recording. It is this processed version which will now be referred to as the Aligned audio that will be accurately in synchronism with the Original Recording and, hence, with the corresponding section of original video.

In this embodiment, the Aligned audio is stored on the hard disk 140 (or in RAM 118) and its existence and identity will be displayed in one of the previously "empty" Take recording holders 371, 373, 374 in the Recorder section 370. As shown in FIG. 3, for example, the user would see a name in the position of the selected Recording holder 371, labelled here "Recording M+1". In fact, only data pointing to the location of the Aligned audio on the disk 140 (or in RAM) will be held. The user can, optionally, generate commands via the pointing device 120 to audition, "erase" or name any of these recordings by using, for example, a right click menu if the device is 120 is a mouse. A name is entered by use of the keyboard 125 in a naming mode selected by the device 120.

By clicking on one of the Take recording holders 371, 373 and 374, the user can choose which one is selected for playback when the Line is played with the Play button 363, or when the Scene is played with the Play Scene button 344. In this example, there are three Take recording holders 371, 373, 374 which the user can record into and choose from for each line that is revoiced. Any non-zero number of these recording holders may be provided. For easy use, when a new recording is initiated, the system automatically finds which of the recording holders is empty (i.e. available) and uses it. When a new Take is created, it is automatically made the Selected Take.

If the Play Scene button 344 is actuated, the interface image in the display screen 130 is replaced by a full-screen version of the video display window 330.

Other playback options are available: If the user presses the Play All button 346, the videos of all of the Scenes will be played in their normal running order using the selected Takes for each Line in each Scene.

One advantage of this system is that the Lines and Scenes do not have to be recorded in any particular order, but when a Scene is played back, the system plays the Lines in the Scenes in their correct original sequence. Similarly, Play All 346 will play the Scenes in their original order.

A Stop button 364 can be pressed at any time to stop the audio and video playback in the Rehearse, Record, and Play Line modes. Additionally, for the Play Scene and Play All modes, a key on the keyboard 125 such as the spacebar, can be designated as a Stop key so that the full screen video image can be stopped during these playback modes and the graphical user interface 320 restored.

For improved operation, the user can adjust the microphone input level by clicking on and dragging a microphone level control slider 382 within the boundary of a mike level control range shown by 383. The level of the mike input is displayed "live" on the screen in real time by a graphic microphone level meter 381. The user can also adjust the overall audio playback level by dragging a volume level control slider 384 within the boundary of a volume control range 385.

The interface illustrated by FIG. 3 can be extended to offer more options such as the selection of different Programmes, each containing different Scenes and the addition of further audio signal processing to change the recorded voice characteristics. In addition, the recorded Takes can be shown in many ways, including, for example, time-sequenced blocks or waveforms.

In the present embodiment, the media data, media-related data and the run-time application program which carries out the operations described above are assembled together and delivered to the User's system 100 on a CD ROM or DVD ROM 165 (FIG. 1) or other high capacity memory device. The Internet 175 could be used as an alternative delivery method for one, both or any part of these components. The user's system 100 can also be provided by other forms of connected sets of electronic components capable of receiving the data, displaying a graphical interface, recording, playing back and processing digital signals, and manipulating data.

Overview of Preparation Phase and Revoicing Computer Program Creation

There is no guarantee that voice audio streams in an original audio visual media recording synchronize accurately with the lip movements in the video. For example, the audio could contain a foreign language dubbed dialog track. However, the media selected for use in this invention should be chosen specifically for having an adequate proportion of sufficiently accurate lip movement synchronization between original audio and video tracks to make revoicing worthwhile in terms of entertainment.

Figure 4:
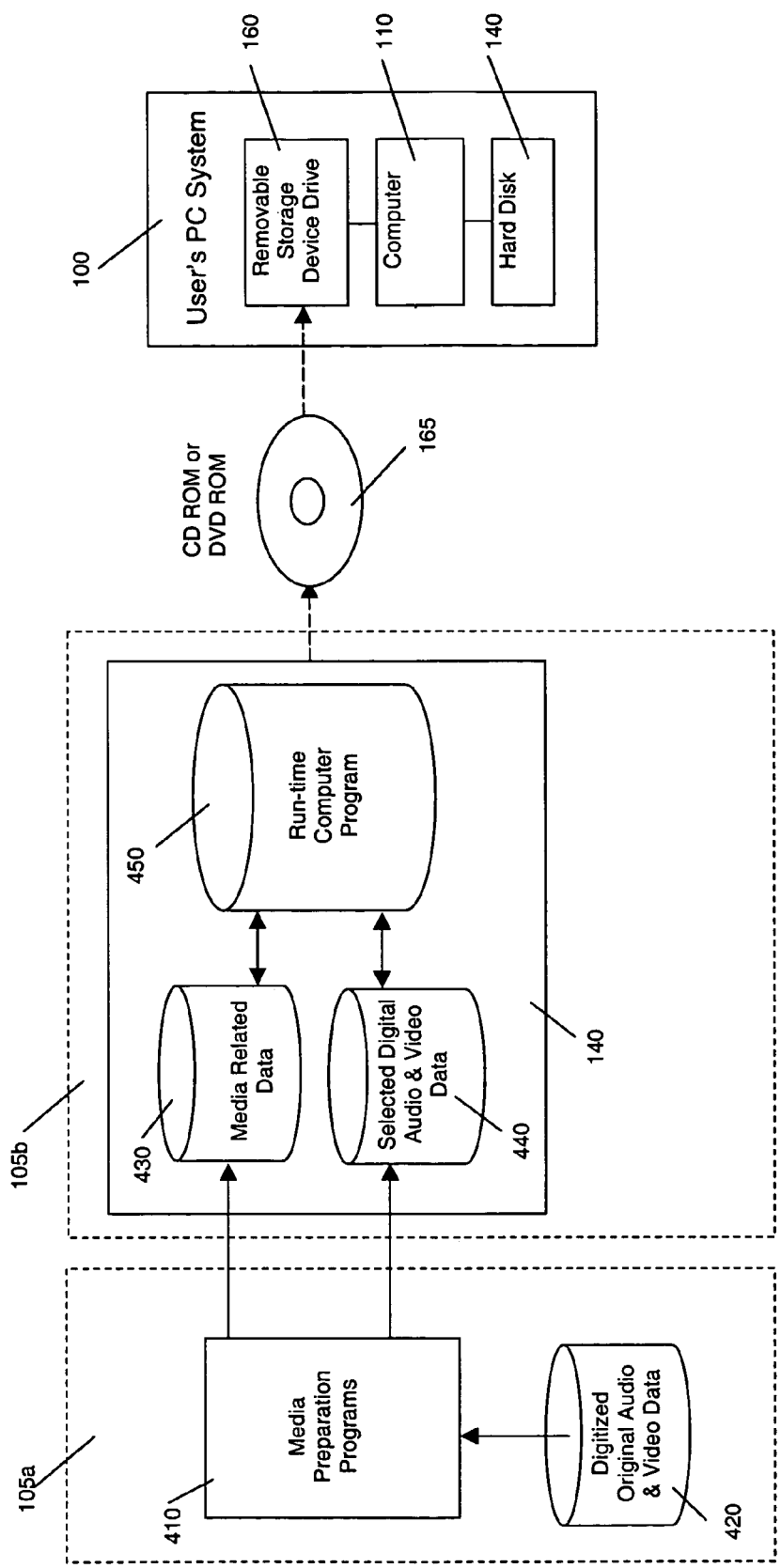
FIG. 4 is a block diagram schematically illustrating, according to one embodiment of the present invention, the main elements within the various computer systems involved in creating an end-user program which is transferred to a user's PC by removable media and provides revoicing of embedded media.

Media data preparation and creation of a revoicing computer program are represented schematically in FIG. 4. Media data preparation simplifies the revoicing operation for the end user.

Figure 1:
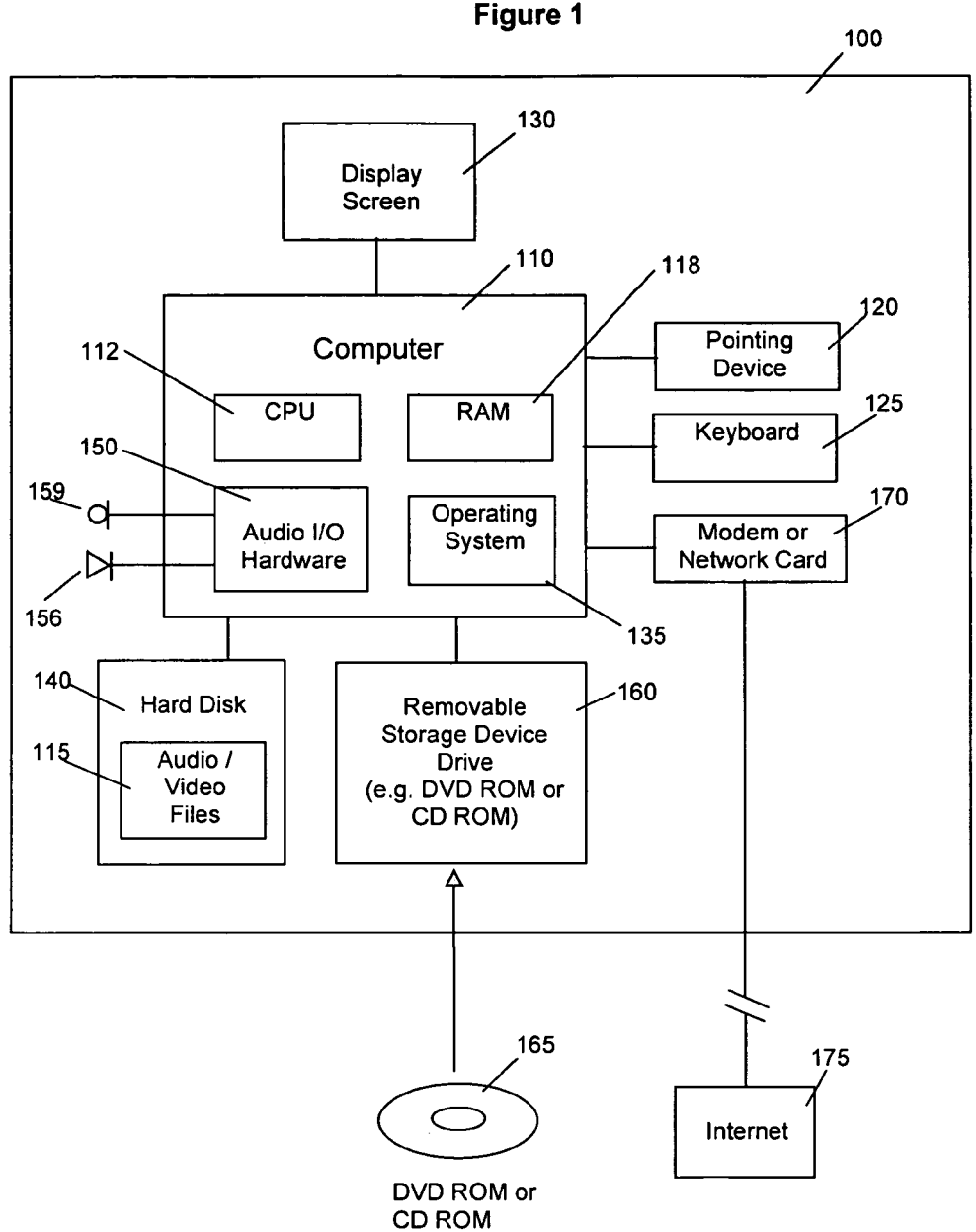
FIG. 1 is a block diagram of the typical components found in a typical home PC system.
Figure 2:
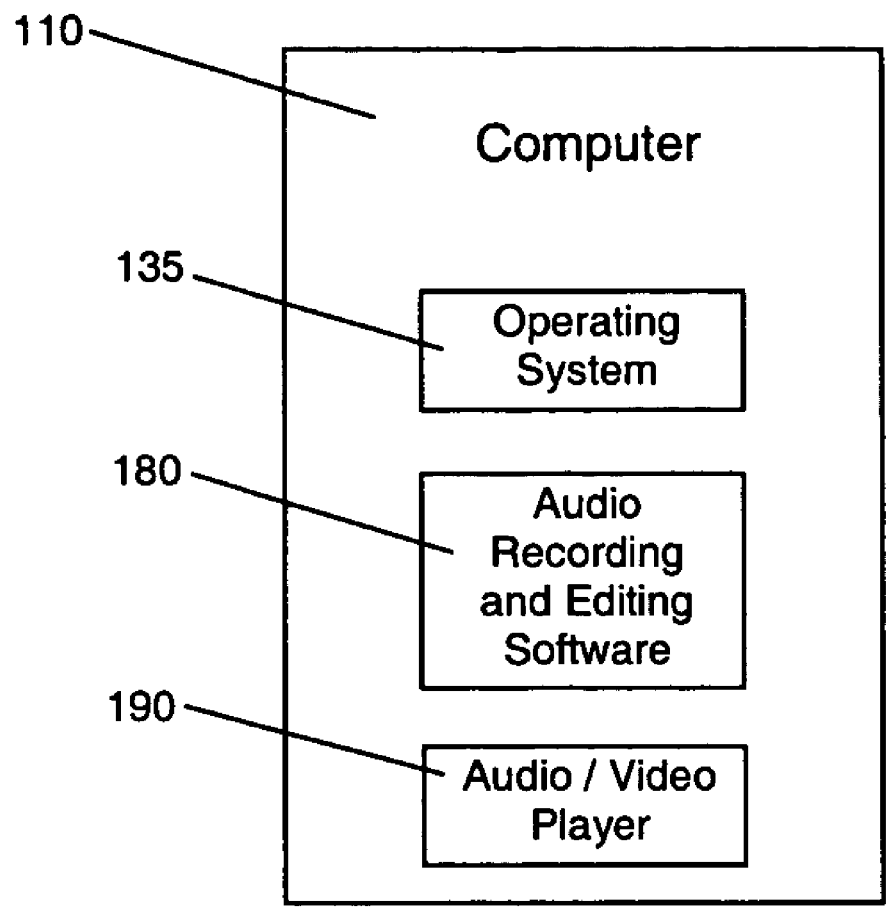
FIG. 2 is a block diagram illustrating prior art software components in a typical PC environment.

A media preparation computer 105*a* is shown in FIG. 4 which, in one example, can be a personal computer system such as the system 100 shown in FIG. 1. A second similar computer 105*b* and its hard disk 140 is shown and data created in computer 105*a* can be transferred to computer 105*b* via normal data transfer means including removable disks or networks. In this case, computer 105*b* can be used to test the program operations on the media and confirm the media has been edited correctly before creating a copy of the program on removable media 165 that can transfer the program and media to an end-user's computer 100. In some circumstances, it can be efficient for the computers 105*a* and 105*b* to be the same computer, thereby allowing testing of the program and refining of the media editing and markup as necessary within the same computer.

In this embodiment, a person skilled in media data handling, who will be referred to as the Media Preparation Editor, carries out media data preparation steps using a variety of Media Preparation programs 410. Media preparation programs 410 include known software such as the audio editing programs listed previously, video/audio editing programs such as Premiere from Adobe Systems, Inc., still image editing programs such as Photoshop from Adobe Systems, Inc. and digital video file (e.g. MPEG) playback and still image generation programs such as PowerDVD from CyberLink Corp. or Premiere.

In the preferred embodiment, media preparation can be achieved as follows: Firstly, video and audio source media for a Programme are digitized and are stored in media preparation computer 105*a* as Digitized Original Audio and Video Data 420. Using programs such as Premiere or Sound Forge, the digital video files are trimmed, sized and compressed using codecs such as Indeo® Video 5, and the appropriate original audio tracks described earlier are added to the video files into avi format files. The Media Preparation Editor then decides what sections of the digitized original audio and video data 420 are to be used as Scenes and selects those portions of the digitized original audio and video data 420 which include the Scenes. The extent of a Scene is largely determined by artistic and creative decisions on the part of the Media Preparation Editor and naturally based on the programme content. Using Sound Forge, Premiere or other digital audio and or video editing programs, the relative start and stop times of the desired Scenes and Lines and other media-related data which defines and identifies these divisions in the digitized media are logged and included in Media Related Data files 430 for later use. Those portions of the digitized original audio and video data 420 which do not include Scenes can be discarded.

Representative digital still images are created from the video files as snapshots to be used to identify Scenes and similar still images are created to identify the original characters. These images are included in the Media Related Data files 430. Other Media-Related Data includes media file names. The preparation of further media related data will be described hereinafter with reference to FIG. 11. The Media Related Data is entered into one or more XML data files as described in more detail hereinafter.

In this embodiment, some of the preparation is manual and some can be done automatically. Such steps of media digitisation, media measurements, and media preparation steps can take place in a plurality of multi-media PCs so long as the resulting media data and/or other data can be transferred or made available to the computer 105*b* where the testing and building of the end-user program are achieved. The manual preparation steps may be automated in alternative embodiments and may even run within the end user PC system 100.

The run-time computer program 450, whose application specific modules are written in C++, utilizes the data 440 and 430 and carries out the system operations in the end user's computer system 100.

A further optional process can be run in computer 105*b* on the data 430 and 440 and on the program 450 to compile these elements into a form which also includes restructuring the data into a compact format for commercial release. This step also reduces the risk of reverse engineering.

This complied version of the program and data can also be copied to removable medium 165 and that version will run on the end user's PC system 100 efficiently.

In either case, the program on medium 165 is loaded into the user's system 100 to run in the computer 110 either directly from the removable media storage device 165 or after being copied to the hard disk 140.

Details of Media Preparation Phase

The first step of media preparation is to convert the Programme's media, which often is provided in a film or standard analog video and audio format, to digital media files suitable for this process.

If the source Programme is in a film format, a commercial audio/video transfer facility can convert the film's content via a standard telecine process to analog format on tape or to a digital video format such as NTSC or PAL Digital Betacam® tapes. To turn analog video and audio signals on tape into digital video and audio data, either a commercial video transfer facility can create the files with dedicated hardware, or this can be achieved on a specialized PC. Suitable video and audio hardware cards and software codecs are known. Such processes will be familiar to those skilled in the art of audio and video conversion techniques.

The digital media files are created in a format that can be transferred to the program preparation computer 105*a* for example via CD ROM or a network, so that the Media Preparation Editor can access them to create the prepared data required for the revoice processing. Examples of suitable file formats are given in a table hereinafter.

It is preferred that along with the video, the following audio tracks are obtained as separate tracks either on the same video tape, on separate digital or analog audio tapes, or by other means of audio data transfer such as CD ROMS or digital networks. Such separate tracks are generally available because during the making of a large proportion of the original programmes to which this invention may be applied, separate audio tracks are recorded and or generated and kept on multitrack tapes or in a multitrack format on a digital audio recording and editing system. In these cases the following audio tracks would be obtainable and then can be digitized via standard studio techniques.

The Dialog track (or tracks), optimally of each character separately if there are any characters speaking at the same time, or combined if there are no such overlaps.

The Music and Sound Effects ("M&E") tracks, which can be mixed into a stereo pair or a single monophonic track. For added flexibility, the music tracks and the effects tracks can remain separated, but this would not alter the functionality required.

The mixed original track ("Full Mix")— containing the "final" mix of all the dialogs and the M&E tracks.

For revoicing singing, it is also useful to obtain mixes with only harmony and/or backing tracks and without the principal voice that is to be revoiced.

In the cases where the source media is not available in multitrack form, it is possible to either accurately recreate the required backing tracks or solo vocal tracks in the format required or apply digital audio signal processing techniques to obtain some or all of the elements required. For example, sometimes simple phase reversal of one channel of a stereo recording and summing it with the other channel can remove voices which were equally present on both channels and leave the out of phase components of a background track.

The following table indicates examples of the file formats and codecs used in the present embodiment to digitise the signals listed for each Scene.

| Digital Media Description for Each Scene | File Type Used | Digital Coding Used |
|---|---|---|
| Digital Video File | .avi | Indeo ® Video5 compression |
| Digital Audio - Main Dialog File | .wav or .avi | 16 bit PCM |
| Digital Audio - Auxiliary Dialog File (required in the case of overlapping dialog) | .wav or .avi | 16 bit PCM |
| Digital Audio - Music and Sound Effects ("M&E") | .wav or .avi | 16 bit PCM |
| Digital Audio - Mixed Dialog and Music and Sound Effects ("Full Mix") | .wav or .avi | 16 bit PCM |

A set of such digital media files for each Scene provides a library of Scene data from which, when one Scene is selected by the user, the appropriate data can be combined by computer software modules into synchronized streams of digital audio and video data which, when fed through the user's computer video and sound systems, appears to the user as a complete original "video" clip.

For music videos, the term Vocals replaces the term Dialog, and the Music and Effects data stream would simply be backing Music. An additional optional Music track, containing the backing music plus any background and harmony vocals, can also be created for playing back with the user's vocal in order to most accurately recreate the song.

If the video is in an avi format file with no audio, the Media Preparation Editor can, on a current standard PC used as the computer 105a in FIG. 4, insert into the avi file (using a sound and video editing program such as the Sound Forge® program version 4.5 from Sonic Foundry®) one or more of the audio streams (shown in the above table) to create a single avi file with all or most of the digital media data related to a Scene. This creates a multiplexed audio/video file that has advantages in convenience of data management and improving data access during streaming.

The avi file format has the further advantage that, by using DirectX®) components available from Microsoft® along with the Microsoft Windows® operating system, which provides the required codecs, the revoicing computer program supplied on the removable media 165 to the end user can instruct standard Microsoft software modules in the end user's PC 100 to create, select, decode and play back avi files simultaneously and synchronously with wav files at the correct sample rate and/or frame rate. Also, when required, playback can be started from a specified offset from the start of the media data file. Generally, the first sample or video frame in each file is defined as time zero for that signal, unless there is data representing a start time offset present in the file or maintained elsewhere in a corresponding database.

Apart from the advantages listed above, it is not functionally significant whether the selected audio and video data are combined into a single data file or remain in multiple files, so long as enough information is maintained in a database to ensure that the appropriate media data can be located, combined and played back synchronously through the end user's computer system 100 when required.

Once the digital audio and video files for a Programme are created and accessible to the Media Preparation Editor, the next step in data preparation is to measure and log certain details of the signals.

In the data preparation stage, the Media Preparation Editor decides on an XML internal reference name for each Scene and other names as required. He then, using software on the Program Preparation Computer 105a, manually measures and logs the start and end times of the Scenes and then does the same for the Lines for each Character in the Scene. The duration of a Scene can typically be from 20 or 30 seconds to one or two minutes. The Media Preparation Editor makes these measurements by viewing and/or auditioning the audio/video files (avi's) and the corresponding synchronized digital audio streams using a commercially available PC-based digital audio editor such as Sound Forge or Pro Tools. This is discussed further below.

What determines Line segmentation and boundaries is somewhat arbitrary but it is based on skilled decisions by the Media Preparation Editor who must judge what length would be easy for the typical user revoicing that particular dialog to repeat without errors. Thus a Line can sometimes be as short as a single word or sound, or as long as a sentence or multiple sentences. Typically, one Line is a phrase in a sentence or a whole sentence.

Figure 5:
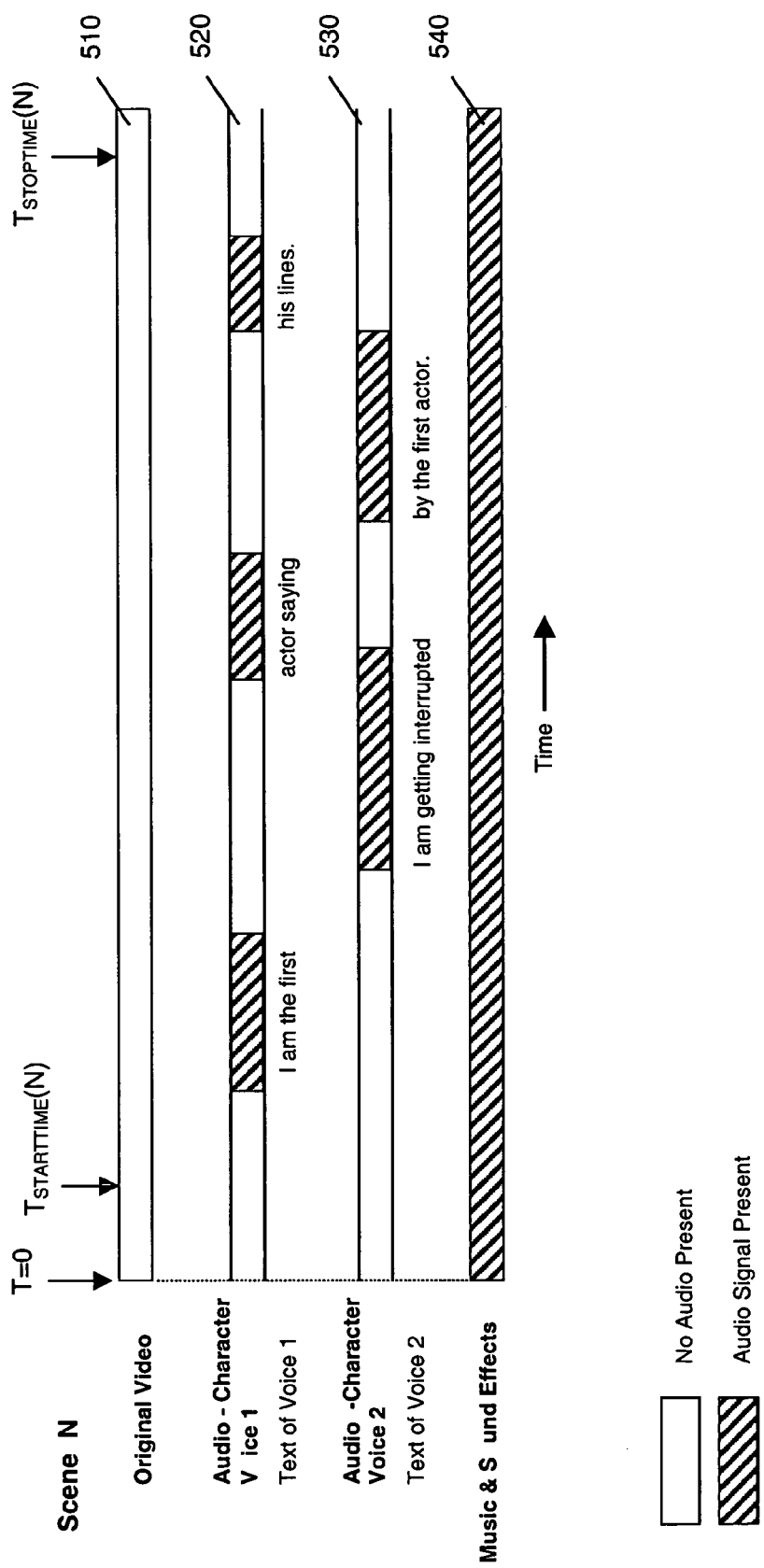
FIG. 5 illustrates schematically the relationships between various media data streams that are present in a selected audio video clip, according to one embodiment of the present invention.

In FIG. 5, for an example the extent of "Scene N" has been determined and is shown to contain five lines in audio tracks 520 and 530. The relationships of the signals in the various digital media streams, as they might exist in the signal data files described above, are shown schematically, along with sample text transcribed from two character voice dialog streams.

The length of the streams of digitized original audio and video data containing this Scene is shown by an original video stream 510 in FIG. 5.

The start of the original Video stream 510, which corresponds to slightly more than the length of example Scene N, defines a reference start time, T=0, for both the video and the related audio streams. Character Voice 1, original audio stream 520, is shown comprising three separated Lines and Character Voice 2, original audio stream 530 is shown with two Lines. In this example the end of the first Line of Character Voice 2 overlaps the second Line of Character Voice 1. Lastly, the M&E (Music and Sound Effects) stream 540 is shown as a continuous signal, regardless of whether or not there is actually audio present in this stream. Scene N in FIG. 5 is marked as starting at a start time $T_{STARTTIME}(N)$ and ending at a stop time $T_{STOPTIME}(N)$. Line Start and Stop times are chosen to be near the boundaries of the hatched blocks in the audio streams 520 and 530, but to allow for added lead-in time and lead out time to give the user added visual cues from the video stream at the start and spill over time at the end respectively. The Media Preparation Editor determines these boundary times by listening to the signals as well as by observing their waveforms in the audio editing software programs. He then can note the offset measured from the start of the file, T=0, as will be discussed further below.

Because the Character voices are generally closely synchronized with the lip movements in the video, Original Character audio will act as and frequently be referred to in this description as the "GUIDE" signals, to which a replacement (user recording or "DUB") will be edited in the revoicing process so that the edited version will consequently be synchronized with the video.

During media preparation, with reference to FIG. 4, images representing a Scene to be used in the Scene Selector 340 (FIG. 3), or images representing characters in the character window 355 can be captured from the digital video file using commercial digital video and image editing programs on PC 105a. Which images are captured is based on artistic decisions on the part of the Media Preparation Editor. The captured images are saved as graphic image data files in .jpg or .bmp file formats and are included in the Media Related Data 430. Alternatively, the Computer Program 450 can "grab" frames of video data from the appropriate original video data file in 440 at the times corresponding to the starts of Scenes or Lines in order to create automatically snapshots required for the main video display window 330.

In addition to measuring the waveform, the Media Preparation Editor creates as part of the process carried out by the Media preparation programs 410 a database of names, data descriptors and measurements that make up part of the media related data 430 and will be used eventually as input data by the application computer program 450 to obtain the operational results described above. In this embodiment, the Media Preparation Editor uses a commercially available XML editing program such as Xmlspy® available from www.altova.com to populate the database of Media Related Data 430 by entering such data into an XML (Extended Markup Language) file.

XML data structures can be easily defined, and they expedite the means by which the data can be processed by the computer program 450, which is written to recognise and act on the variables so defined. Once the computer programmer defines the data structure and variables in a DTD file, as described fully in references such as "Learning XML" by Erik T. Ray, O'Reilly & Associates, 1st edition (2001), the xmispy program enables the Media Preparation Editor to enter efficiently the required data into the defined structures.

The main definitions of XML variables (in bold, uppercase or capital letters and between brackets < >) which the editor fills in for each audio/video PROGRAMME are given below. Time measurements are made relative to the VIDEO start time, taken as T=0, unless otherwise stated. Indenting in the list below indicates that the indented variable is related to the immediately preceding non-indented variable and defines further information about that parent variable. A reference name not emboldened represents a specific instance of such a variable that would refer to an actual file. This is clarified further in the example .xml file that is given following the definitions below.

```
<PROGRAM> - Contains all the information and static data that will be transformed into a
form that will be used by the end-use application program to process the data to effect the
opeartions described in this embodiment. A PROGRAM.XML file will generally contain
information relating to one or more scenes from a single film, video or a music video.
   <TAKE_DIR> - Identifies the directory to be used to store the processed (aligned)
   user audio data recordings on the computer running the application.
   <VIDEOS> - List of video files used by the application program.
      <VIDEO> - Information follows defining a video file used by the program.
         <VIDEO_REF> - Unique identifier string used to reference this entry
         from other parts of the PROGRAM.XML file.
         <VIDEOFILE> - Name and path of the video file. The path is relative
         to the location of the PROGRAM.XML document.
   <GUIDES> - List of Guide file names used by the application program.
      <GUIDE> - Information follows defining a data file whose contents are used
      to align the user's recording with the moving images in the video file.
         <GUIDE_REF> - Unique identifier string used to reference this entry
         from other parts of the PROGRAM.XML file.
         <GUIDEFILE> - Name and path of the file containing the alignment
         information. The path is relative to the location of the
         PROGRAM.XML file.
   <STILLS> - A list of still image data files used in the interface.
      <STILL> - Information follows defining a still image. The images are
      representative snapshots of each Scene or Character whose dialog will be
      replaced by the user.
         <STILL_REF> - Unique identifier string used to reference this entry
         from other parts of the PROGRAM.XML file.
         <STILLFILE> - Name and path of the file which contains the image.
         The path is relative to the PROGRAM.XML file.
         <WIDTH> - Width of the image in pixels when it is displayed in the
         user interface.
         <HEIGHT> - Height of the image in pixels when it is displayed in the
         user interface.
   <SCENES> - Lists of the Scenes in the programme
      <SCENE> - contains the information required by the application to control
      activity related to the Scene
         <SCENE REF> - Unique identifier string used to reference this entry
         from other parts of the PROGRAM.XML file.
         <NAME> - name of the scene displayed in the user interface.
         <VIDEO_REF> - Identifier used to select the entry in the <VIDEO>
         array which references the source file of the video and edited
         audio data streams for this Scene.
         <STILL_REF> - Identifier used to select the entry in the <STILL>
         array which references the still image file representing the
         scene in the Scene selector (in FIG. 3 at 341)
         <STARTTIME> and <STOPTIME> - Are the Start time and Stop time
         respectively of the Scene in the source video file. These
         define the limits of the Scene's video and audio data played
         when the user presses the Play Scene control;
         <CHARACTERS> - List of the Characters used in the Scene.
            <CHARACTER> - Information follows below about a
            Character used in the scene
               <CHAR_REF> - Unique identifier string used to reference this
               entry from other parts of the PROGRAM.XML file.
               <NAME> - Name of the Character displayed to the user as
               shown in FIG. 3 at 355.
               <STILL_REF> - Reference to the still image used to
               represent the Character in FIG. 3 at 355.
         <LINES> - List of the lines that make up the Scene.
            <LINE> - Information follows below about an individual line.
               <CHAR_REF> - Identifier used to select the
               Character in the <CHARACTERS> array who
               is speaking the line.
               <STARTTIME> and <STOPTIME> - Playback start
               and stop time for the line within the source
               video. These include the editor's added
               extensions to allow lead-in and lead-out.
               <GUIDE_REF> - Identifier used to select the entry in
               the <GUIDES> array which contains the
               Guide data used to align the user's recording.
               <GUIDE_START> and <GUIDE_STOP> - When the
               alignment process takes place, these
               variables define the start and stop time of the
```

Figure 12:
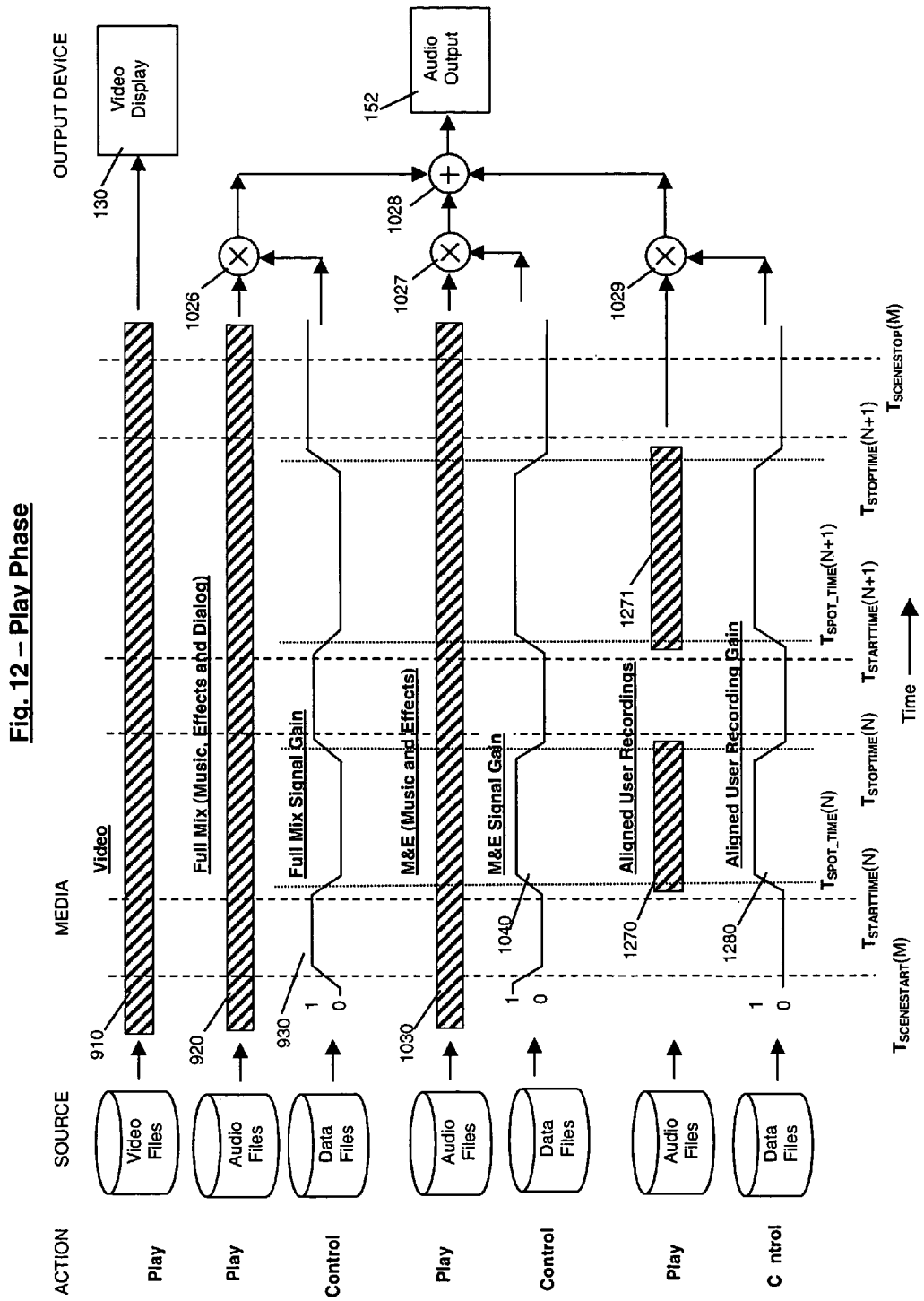
FIG. 12 illustrates schematically the various media sources, actions with these sources, the relative timing of main events in the media and the output destinations involved in the Play Phase operation according to one embodiment of the present invention.

-continued data to use in the Guide file. (These times are relative to the start of the Guide file.)
<DUB_START> When recording the user input, only audio after this time will be used in the alignment process. This time is also used to switch off the Full Mix signal and switch on the M&E signal in FIGS. 10 and 12,
<DUB_STOP> - When recording the user input, this specifies the time after which the user input will be discarded. This time is also used to switch on the Full Mix signal and switch off the M&E signal in FIGS. 10 and 12.
<SPOT_TIME> - Time relative to the start of the playback of the video at which to start playing the Aligned user Take when playing back the resulting Line in the selected Scene as shown in FIG. 12.
<WORD> - Defines information which follows below about a word or group of sounds visually represented to the user to cue the timing of their recording. Sometimes this may be several words or part of a word.
  <TEXT> - Strings of dialog text or transcriptions of the sounds made by the Character which are displayed to the user in FIG. 3 at 353.
  <START> - Start time of the word or utterance. This is used to highlight the word in the user interface as the video reaches this time.
  <DURATION> - Length of time that the text will be highlighted. If no DURATION is defined for a TEXT entry, that entry lasts until the time the next TEXT string starts.

The Guide and Dub identifiers and times are required to implement many of the voice replacement functions. The use of these variables will be discussed further hereinafter.

A sample of the XML file structure using the variables defined above is given below. The Media Preparation Editor uses xmlspy or equivalent to place the data definitions or measured values between the variable's name <Variablename> and the "end of variable" marker </Variablename>.

Sample XML program file contents with Media Content and timing variables

```
<PROGRAM>
  <TAKE_DIR>\ReVoice\MovieTitle</TAKE_DIR>
  <VIDEOS>
    <VIDEO>
      <VIDEOFILE>AVIs\MovieClip01.avi</VIDEOFILE>
    </VIDEO>
    <VIDEO>
      <VIDEOFILE>AVIs\MovieClip02.avi</VIDEOFILE>
    </VIDEO>
  </VIDEOS>
  <GUIDES>
    <GUIDE>
      <GUIDEFILE>Guide Audio\Character1.wav</GUIDEFILE>
    </GUIDE>
    <GUIDE>
      <GUIDEFILE>Guide Audio\Character2.wav</GUIDEFILE>
    </GUIDE>
  </GUIDES>
  <STILLS>
    <STILL>
      <STILL_REF>Scene1 Image</STILL_REF>
      <FILE>Stills\Scene1 Image.bmp</FILE>
      <WIDTH>83</WIDTH>
      <HEIGHT>75</HEIGHT>
    </STILL>
```

Sample XML program file contents with Media Content and timing variables

```
    <STILL>
      <STILL_REF>Character01 Image</STILL_REF>
      <FILE>Stills\Character01.bmp</FILE>
      <WIDTH>72</WIDTH>
      <HEIGHT>69</HEIGHT>
    </STILL>
    <STILL>
      <STILL_REF>Character02 Image</STILL_REF>
      <FILE>Stills\Character02.bmp</FILE>
      <WIDTH>72</WIDTH>
      <HEIGHT>69</HEIGHT>
    </STILL>
  </STILLS>
  <SCENES>
    <SCENE>
      <SCENE_REF>Scene1</SCENE_REF>
      <NAME>Scene1 Title</NAME>
      <VIDEO_REF>MovieClip01</VIDEO_REF>
      <STILL_REF>Scene1 Image</STILL_REF>
      <STARTTIME>0</STARTTIME>
      <STOPTIME>23.14</STOPTIME>
      <CHARACTERS>
        <CHARACTER>
          <CHAR_REF>Character 01</CHAR_REF>
          <NAME>Fred</NAME>
          <STILL_REF>Character01 Image</STILL_REF>
        </CHARACTER>
        <CHARACTER>
          <CHAR_REF>Character 02</CHAR_REF>
          <NAME>Betty</NAME>
          <STILL_REF>Character 02 Image</STILL_REF>
        </CHARACTER>
      </CHARACTERS>
      <LINES>
        <LINE>
          <CHAR_REF>Character 01</CHAR_REF>
```

-continued

Sample XML program file contents with
Media Content and timing variables

```
        <STARTTIME>0</STARTTIME>
        <STOPTIME>1.5</STOPTIME>
        <GUIDE_REF>Character1.wav</GUIDE_REF>
        <GUIDE_START>0.36</GUIDE_START>
        <GUIDE_STOP>1.497</GUIDE_STOP>
        <DUB_START>0.26</DUB_START>
        <DUB_STOP>-1</DUB_STOP>
        <SPOT_TIME>0.36</SPOT_TIME>
        <WORD>
          <TEXT>Hello</TEXT>
          <START>0.36</START>
          <DURATION>0.6</DURATION>
        </WORD>
      </LINE>
      <LINE>
        <CHAR_REF>Character 02</CHAR_REF>
        <STARTTIME>1.0</STARTTIME>
        <STOPTIME>5.0</STOPTIME>
        <GUIDE_REF>Character2.wav</GUIDE_REF>
        <GUIDE_START>2.856</GUIDE_START>
        <GUIDE_STOP>4.516</GUIDE_STOP>
        <DUB_START>2.484</DUB_START>
        <DUB_STOP>-1</DUB_STOP>
        <SPOT_TIME>2.856</SPOT_TIME>
        <WORD>
          <TEXT>Hey!</TEXT>
          <START>3.0</START>
          <DURATION>.5</DURATION>
        </WORD>
        <WORD>
          <TEXT>How</TEXT>
          <START>3.7</START>
        </WORD>
        <WORD>
          <TEXT>are</TEXT>
          <START>3.84</START>
        </WORD>
        <WORD>
          <TEXT>you?</TEXT>
          <START>3.95</START>
          <DURATION>0.5</DURATION>
        </WORD>
      </LINE>
    </LINES>
  </SCENE>
</SCENES>
</PROGRAM>
```

It will be appreciated that the Scene <STARTTIME> in FIG. 5 is at a positive offset from the start of the video file which defines T=0.

Figure 6:
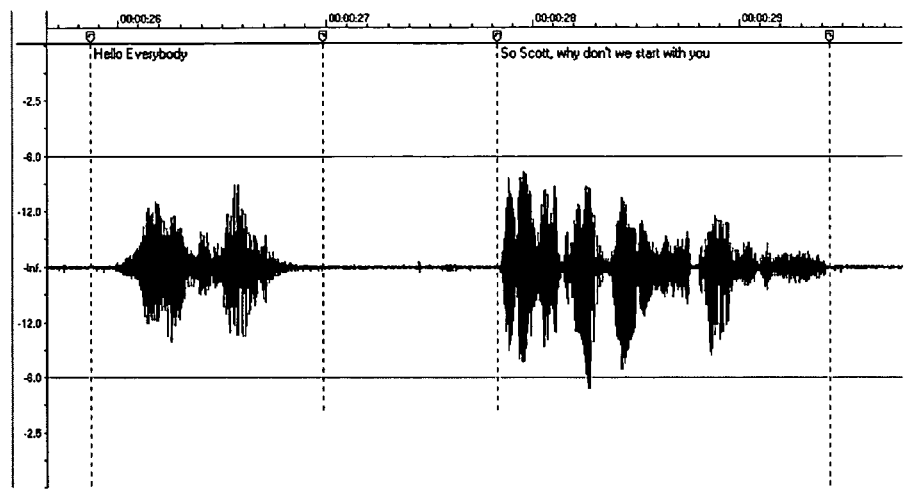
FIG. 6 illustrates an example of the audio waveform display in a typical commercial audio editing system used by the Media Preparation Editor in which the Start- and Stop-Times of two Lines are shown marked by two pairs of dashed lines.

An example of the output display on display screen 130 of a PC using a commercial sound editing program such as Sound Forge by the Media Editor to measure and log two lines' STARTTIMEs and STOPTIMEs is shown in FIG. 6. The timing measurements for Scenes (not shown in FIG. 6), Lines and Words are made relative to the Video start time, i.e. T=0.0. The logged entries for this example are shown below.

| LINE TEXT | STARTTIME | STOPTIME |
|---|---|---|
| Hello, everybody. | 25.861 sec | 26.981 sec |
| So, Scott, why don't we start with you? | 27.823 sec | 29.437 sec |

Each Line's STARTTIME is marked initially as the time measured from T=0, just before a Character begins to utter a sound associated with a section of their dialog, and the same Line's STOPTIME is defined as the time measured from T=0 just after the same Character finishes uttering a sound associated with the same Line of their dialog. However, the editor can add in extra time at the beginning and end of a line to allow the user to get cues from previous dialog and to overrun at the end. The region of the recorded line to submit for processing (without the audio recorded during the lead-in and, optionally, lead-out) will be determined and logged as described previously as the DUB_START and DUB_STOP times.

Measurements of the start and stop times for each Word or character's sound in each Line are similarly made by listening to the audio and observing the waveform.

Figure 7:
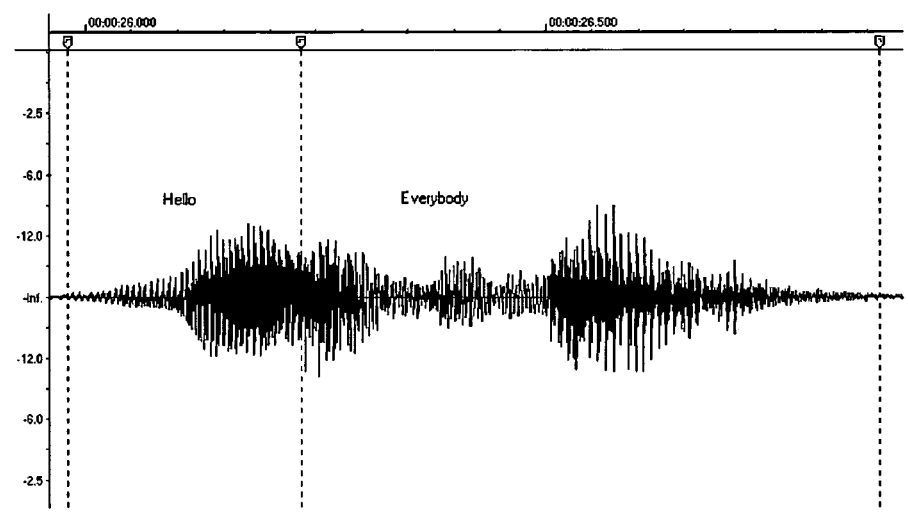
FIG. 7 illustrates an example of the audio waveform display in a typical commercial audio editing system used by the Media Preparation Editor in which the Start- and Stop-Times of two Words in one Line are shown marked by the dashed lines.

An illustration of the measuring and logging of the START-TIMEs and DURATIONS of two words using a waveform editor such as Sound Forge is shown in FIG. 7 and the logged entries are shown below.

| WORD | STARTTIME | DURATION |
|---|---|---|
| Hello | 25.978 sec | 0.883 sec |
| Everybody | 26.233 sec | 0.780 sec |

A technique using speech recognition software in conjunction with an automatic word timing extraction program, such as that described as a component in U.S. Pat. No. 6,185,538 (Schulz), can alternatively be used to automate this word mark up preparation phase.

Once the markup is complete, the file for each programme, which can contain data for several scenes, is saved as a Media Related Data file 430 in an XML format. It is this data that will subsequently be used in the computer program 450.

To summarise the media preparation phase, at this point, a Media Preparation Editor has created .avi files held as data 440 for each Scene, each Scene file containing a selected portion of the Original Video, and the corresponding portions of audio tracks, i.e. an M&E track, one track comprising the Original Dialog tracks mixed with the M&E track (the Full Mix), and separate .wav files for each characters Original Dialog audio also held as data 440. He has also created XML data files held in files 430 containing all the logged data and text for each Scene, Line and Character, all of which serves as database information for the program 450.

User's Computer Program Modules

Computer program modules provide in this embodiment the system control, data processing, recording and playback functions using the media and processed XML data described above, and provide the interoperability between modules and the computer hardware of the end user.

Figure 8:
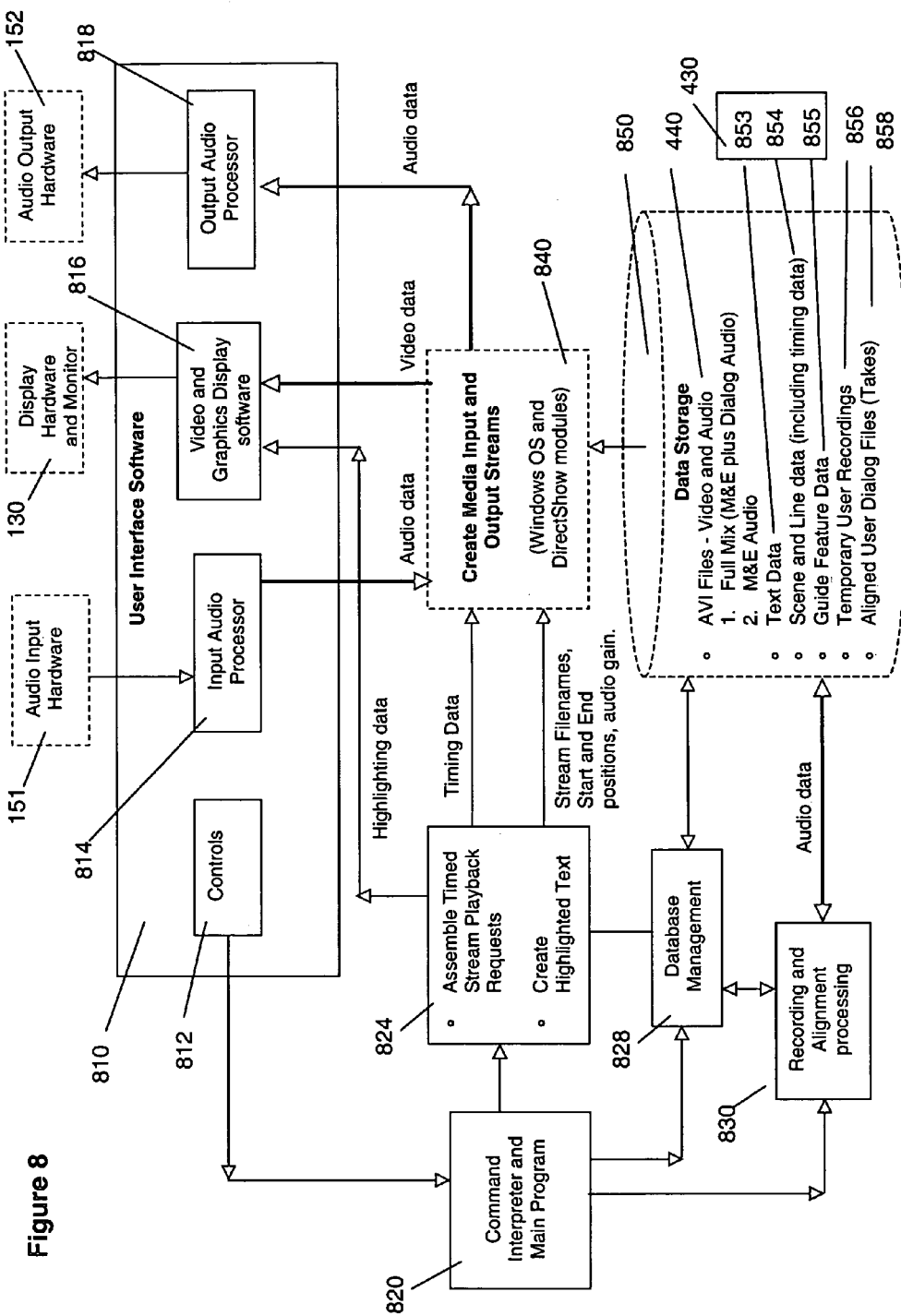
FIG. 8 illustrates in block form the main operational software modules, data storage devices and hardware components which implement the operations of rehearsing, recording, processing, and playback of the user's voice in a PC-based revoicing system according to one embodiment of the present invention.

FIG. 8 is a schematic block diagram containing the main operational software modules 810 to 840 of the Run-time Computer Program 450 and data 430 and 440 which have been assembled as an executable PC application program, copied to CD ROM 165, and loaded from CD ROM 165 onto the users PC system 100 (FIG. 1). The program 450 when run on system 100 in this embodiment carries out the user-initiated operations of the revoicing system described previously in conjunction with the graphical user interface 320 in FIG. 3.

The computer program modules 810 through 830 and application-specific Direct Show modules in the module block 840 can be written in C++, which is described in books such as *The C++ Programming Language* (Special 3rd Edition), by Bjarne Stroustrup, Addison-Wesley, 2000. The same or similar functions may equally be implemented with modules written in other programming languages and environments.

In FIG. 8, blocks bordered by solid lines represent original application-specific software modules written in C++, which when compiled and running on the users computer system 100 or on the computer 105b of FIG. 4: a) provide the graphical user interface 320; b) access audio, video and other data; and c) carry out all the required data processing. Blocks shown bordered by dashed lines represent hardware 130, 151, 152, data storage modules 850 or commercially available software modules included in the module block 840 normally-provided with PC operating systems or as add-ons to operating systems which, among other essential functions, support synchronized playback of multiple digital audio and video signal streams and audio recording.

One example of the software modules of block 840 are those components and drivers provided in the Microsoft® DirectX® versions 8.0 or higher and in the Windows® range of operating systems. DirectX provides access to Microsoft® DirectShow® services, which are used to playback multimedia streams from the local files and capture audio data streams from an audio input device such as the microphone 159. These modules also enable playback of compressed video and audio content (compressed in various formats, including Audio-Video Interleaved (avi), and wav). The DirectShow services provide a modular system of software components called filters, which are arranged into a configuration called a filter graph by a filter graph manager which is a component amongst the modules of block 840 that oversees the connection of these filters and controls the data stream flow. An application program module 824 controls the DirectShow filter graph's activities by communicating with the filter graph manager. These Microsoft modules and their documentation can be obtained from http://www.microsoft.com. In this embodiment, the DirectShow modules and Windows operating system primarily provide the video and audio media handling functions in the module block 840. However, some application-specific DirectShow modules have been written in C++ to provide functions unavailable in the Microsoft library of DirectShow services. These modules reside in the module block 840 and will be described hereinafter.

Other computer operating systems generally have functionally equivalent software modules or can be provided with such modules.

A user interface software module 810 creates and displays the contents of the graphical user interface 320 shown in FIG. 3, services and updates the controls in the interface 320, and supports the video and the audio input and output. Sub-modules 812 to 818 within the module 810 provide specific interface programs: sub-module 812 supports the on-screen control operations of the graphical user interface 320; sub-module 816 co-ordinates the Video and Graphics Display output which is presented to the user via the Display Hardware and Monitor 130. Other sub-modules 814 and 818 control respectively user-initiated Audio Recording and Audio Playback through the PC Audio Input and Output systems 151 and 152 which together form the Audio I/O hardware 150 of FIG. 1. The audio input hardware module 151 includes analog to digital conversion, and the audio output hardware module 152 includes digital to audio conversion. The control sub-module 812 generates user interface commands in response to actuation of controls in the graphical user interface 320. All these application-specific modules and sub-modules can be implemented by those skilled in the art using conventional programming techniques.

A Command Interpreter module and main program 820 responds to the user interface generated commands from the control sub-module 812 to determine which data sources are to be combined to produce the required program action and media output. The main commands requiring different media source combinations are Rehearse, Record, Play, Play Scene and Play All commands, the use of which is described hereinbefore with reference to FIG. 3.

A database management module 828 maintains and accesses a database of files and directories containing the static data which comprises edited Audio/Video files 440, Text Data 853, Scene and Line data 854 including timing data derived from XML data and image files, Guide Signal Feature Data 855, and dynamically created data comprising temporary User Dialog Recordings 856 and Aligned User Dialog 858 (or Takes). The data 853, 854, and 855 are the media related data 430 described with reference to FIG. 4 hereinbefore. In this embodiment, the selected Audio/Video files 440 and media related data 430 are supplied on the CD or DVD ROM or other removable storage device 165 and the user recordings 856 are written to and maintained on a hard disk 140, or in other forms of data storage devices, including RAM, as appropriate. In FIG. 8, the data storage area is generically indicated as data storage 850 and can be implemented using such various or multiple forms of data storage.

Essential to all the operations described herein is the means to maintain exact timing relationships between all the digital media streams during playback and recording. The main modules that enable this are modules 824 and 840 which act together as a Playback and Record engine and in effect drive the other modules of the system. DirectShow Modules in the module block 840 are configured in different ways in dependence upon the operation instructed by the user, as will be explained hereinafter in relation to the Rehearse, Record and Playback operations.

Module 824 receives instructions from the Command Interpreter module 820, calculates any required timing data and assembles lists of control data instructing the audio and video sub-system in module block 840 to construct sequences of selected source data streams from the stored data. The control data includes file names, relative timing and positions of the requested media data content. The control data and media data streams are fed to module block 840, which assembles the media data into the requisite number of output and/or input data streams in correct temporal order, and maintains their relative synchronicity as they are fed through the modules 816 and 818 respectively to the components 130 and 152 that render them into the appropriate audio, video and graphics outputs for the user. Module block 840 also provides mixing and gain processing for the different audio streams as discussed in more detail below.

Further software components in module 824 access, through the database management module 828, text and timing data initially logged in the XML files and stored as text or binary data in storage 850 and present highlighted text on the display 130 synchronized with the audio via module 816.

System Module Actions in Each User-Initiated Phase of Operation

The following descriptions outline the resulting actions that the system hardware and software modules perform in response to the user activating the Rehearse, Record, and Play controls in the graphical user interface 320 of FIG. 3. These actions implement what has previously been described as taking place in the user interface 320.

State changes at buttons and selection areas in the interface 320 are detected by module 812 in FIG. 8 and the resulting system activity is initiated by the command interpreter and main program module 820 on the media and media related data in the data storage 850 with appropriate timings and data access requests computed in module 824.

Figure 9:
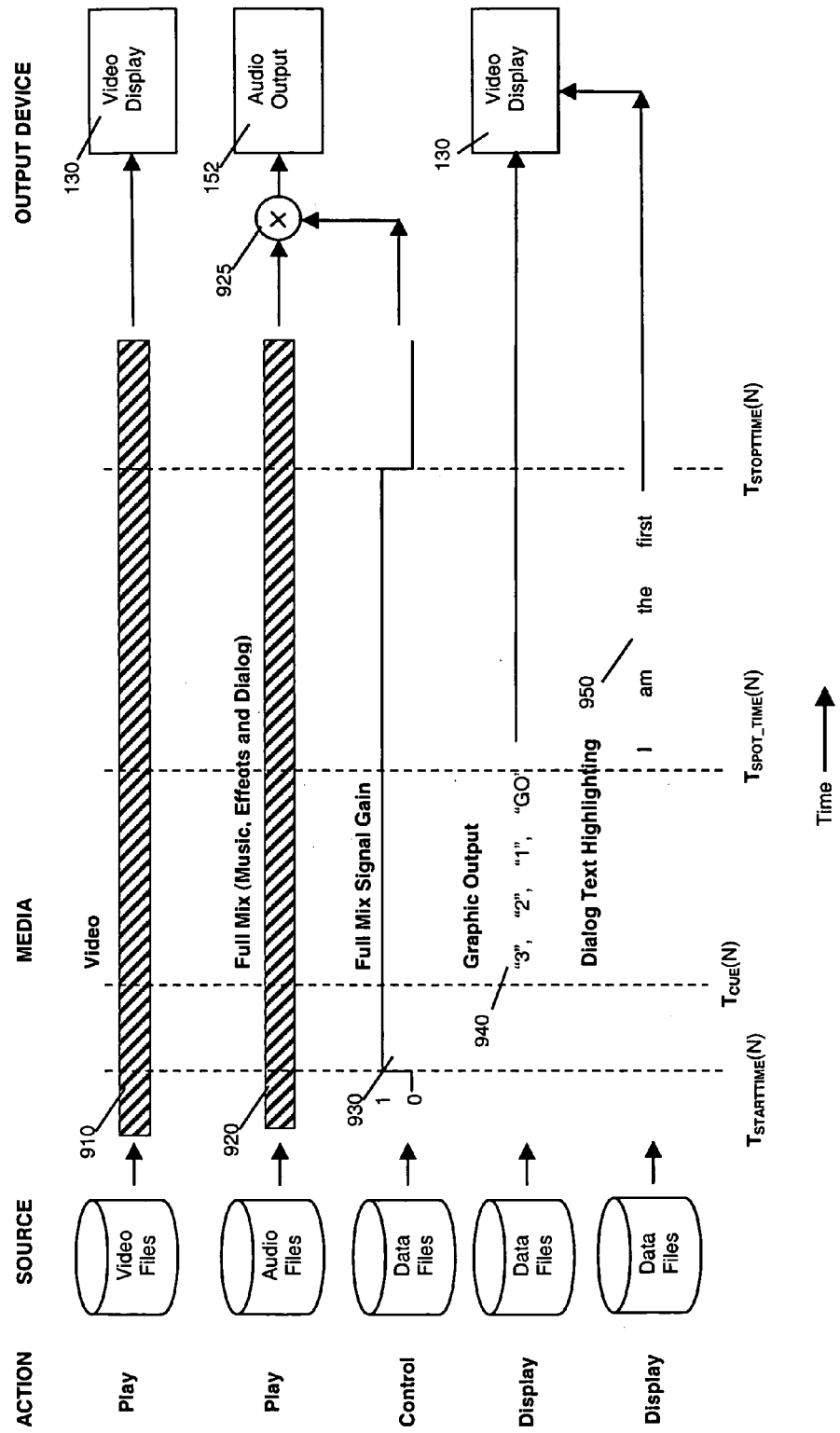
FIG. 9 illustrates schematically the various media sources, actions with these sources, the relative timing of events in the media and the output destinations involved in the Rehearse Phase operation according to one embodiment of the present invention.
Figure 10:
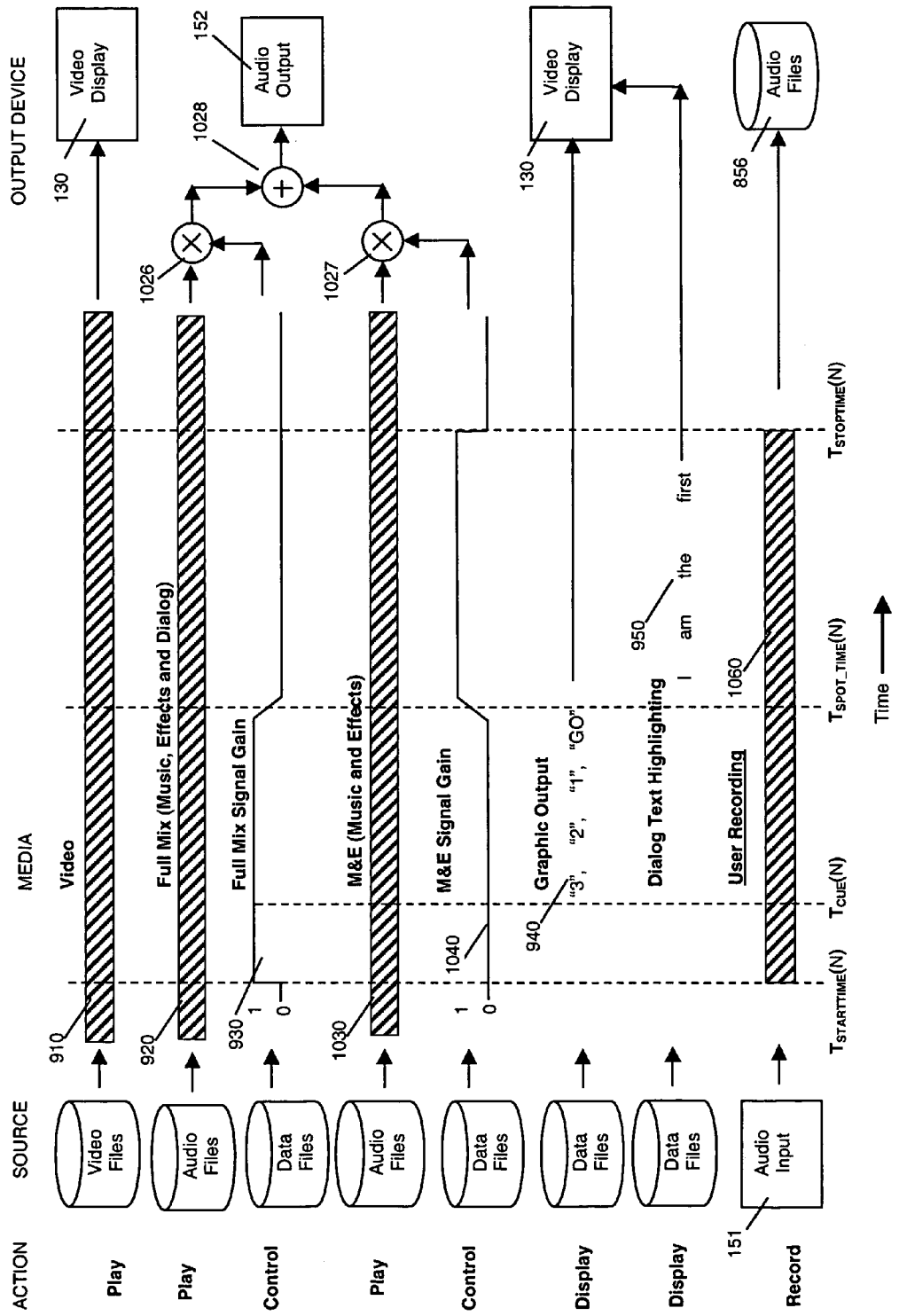
FIG. 10 illustrates schematically the various media sources, actions with these sources, the relative timing of events in the media and the output destinations involved in the Record Phase operation according to one embodiment of the present invention.

FIGS. 9, 10, and 12 illustrate schematically how in this embodiment the various media and data sources are combined in the Rehearse, Record and Play phases to create the sequence of audio, video and graphic outputs that the user hears and sees.

Rehearse Phase

When the user activates the Rehearse button 361 in FIG. 3, the database management module 828 in FIG. 8 accesses the required media, text and timing data for the selected Scene and Line.

FIG. 9 illustrates schematically the relationships between the data sources, the media event timings, and the Output Devices. Module 824 uses Line N's STARTTIME ($T_{STARTTIME}(N)$) to begin the playing of the selected video data stream 910 and the associated Full Mix audio data stream 920 in sync via module block 840.

A Gain Control signal 930 is also computed which, via DirectShow application-specific software modules represented by multiplier 925 in FIG. 9, and similarly by 1026, 1027, 1028 and 1029 in FIGS. 10 and 12, applies audio gain commands to the output audio. Such a software multiplier is given a list of gain time events as control data before the operation starts, and converts the event times from time in seconds into a sample offsets at the data rate of the audio stream. During playback, the software multiplier multiplies the incoming audio data stream by the appropriate gain factor defined at the specified sample times and maintains that gain factor until the next gain event in the corresponding control data occurs.

In FIG. 9 at $T_{STARTTIME}(N)$, the Full Mix audio signal is set to a gain of 1.0. This lets the user hear the original Lines via the audio output system 152 and see on the Video Display 130 the corresponding video action preceding and during the selected Line, which helps the user to prepare and refine his performance. The system stops playing the Line's media at $T_{STOPTIME}(N)$. Generally, to give the user extra time to complete his reading, $T_{STOPTIME}(N)$ is set a second or so beyond the ending of the original dialog in the Full Mix.

The module 824 also computes the time $T_{CUE}(N)$ at which to start the graphic display 940 of the countdown characters "3", "2", "1", and "GO", and times the display of the characters individually in sequence so that "GO" appears at the time the actual Line starts (defined by $T_{SPOT\_TIME}(N)$). This cues the user to begin speaking. These graphic cues are displayed, in the present embodiment, in the Line display and selection window 350. Optionally audible signals such as "beep tones" can also be emitted at the same times as the 3, 2, 1 graphics— but not at "GO" since they would then interfere with recording in the Record phase. At the time of the Line start, the system also highlights, as indicated at 950, in the Line display and selection window area 350, the text of the Line's words or transcribed sounds individually in sync with the original audio signal, giving the user further timing cues during this Rehearse pass. All the timings and text used in this and the remaining phases are derived from the data measurements and text entered in the preparation phase into the XML file.

Record Phase

When the user activates the Record button 362 (FIG. 3), modules 812 and 820 in FIG. 8 respond and engage module 824 in referring to the database management module 828, and this in turn accesses the same media, text and timing data for the selected Scene and Line as was accessed in the Rehearse phase. Again, the system uses Line N's STARTTIME ($T_{STARTTIME}(N)$) which includes the lead-in time at which module block 840 is instructed to begin playing the video 910 and the Full Mix audio 920 data streams in sync, as shown schematically in FIG. 10.

In this phase, unlike in the Rehearse phase, the command interpreter and main program module 820 controls recording of the user's audio and, at $T_{SPOT\_TIME}(N)$, causes the following additional functions to be performed:

Reduction to 0.0 i.e. zero of the gain of the Full Mix signal 920 using Full Mix Signal Gain control data 930 computed by module 824 and fed to module block 840 via the software module multiplier 1026;

Further M&E Signal Gain control data 1040 applied to multiplier 1027 raises from 0.0 to 1.0 the gain of the M&E (Music and Effects) signal 1030 so that the user does not hear the original dialog during the recording phase but hears the rest of the background audio.

Note that although the user can hear the background audio during a recording, the microphone is held sufficiently close to the user's mouth so that the level of airborne background (M&E) signal received by the microphone is negligible compared to the level of the voice and therefore the background audio is nearly inaudible in the Takes.

The module 824 again computes the time $T_{CUE}(N)$ to display the countdown characters "3", "2", "1", and "GO" graphically represented at 940 and times their sequence so that "GO" appears at the time $T_{SPOT\_TIME}(N)$ at which the dialog starts and the user should begin speaking. In practice, recording has already started, as indicated at the start of user recording 1060, which allows the user to be recorded even if he starts speaking too early. During this phase, the module 824 again controls highlighting of the displayed text 950 of the Line's words or sounds in sync with the muted dialog audio signal, giving the user further timing cues during the recording phase.

Recording of the User Recording 1060 through the microphone 159 connected to the Audio Input 151 is started at $T_{STARTTIME}(N)$ and ended at $T_{STOPTIME}(N)$. Recording employs the Input Audio Processor Module 814 which uses the DirectShow recording modules in the module block 840. The module 824 stops the playback through the module block 840 of the Line's video and audio media at $T_{STOPTIME}(N)$ but to give the user extra time to complete his reading, $T_{STOPTIME}(N)$ is normally set a second or so beyond the ending of the original dialog in the Line. These recording modules also synchronize the timing of the digitized user input audio with the playback of audio and video in the other modules 816 and 818.

The user's voice recording is stored as a temporary audio file 856, which is subsequently used as the source of Dub data for the alignment process. Recording and alignment processing module 830 measures and stores the time offset between the start time $T_{STARTTIME}(N)$ of the Full Mix audio output 920 starting and the actual start time of the recording of the user. In this embodiment, the temporary audio data file will be processed immediately according to methods that will be described below.

If further Recordings of a Line are initiated, the management module 828 in FIG. 8 maintains a record of the Takes and presents, through the display sub-module 816, a representation of the additional Takes 373 and 374 for that Line on screen as described hereinbefore with reference to FIG. 3.

Creating the Aligned Replacement Audio Streams

The process of creating a version of the user's dialog recording to serve as an accurate and convincing replacement (in terms of lip-sync) of the original Dialog will be described next. We refer to the original Dialog audio as the Guide audio because its time-varying features will be used to guide the alignment process. A user's edited replacement audio signal is described as "aligned" to the Guide audio if, when measured from corresponding start points in each signal, a substantial proportion of the main audible time-varying acoustic features in the replacement signal occur at the same relative times as corresponding features in the Guide audio.

To achieve such alignment of a user's recording, an automatic audio alignment algorithm is used which analyses both audio signals and automatically edits a Temporary User's recording 856 in FIG. 8 (one of which will be referred to herein as the "Dub" audio because that is a known term in the audio-post production industry) to align to the Guide audio. Such an algorithm has been described in GB2117168 and U.S. Pat. No. 4,591,928 (Bloom et al). It comprises the essential steps of: (a) measuring the same time-varying features of both the Guide and Dub audio and saving these measurements as digital feature data; (b) processing the resulting time-varying feature data to determine a time distortion path that best aligns the Dub audio features to the Guide audio features; and (c) passing the time distortion path to an automatic waveform editor which edits the waveform of the Dub audio according to the time distortion path, whilst also taking into account the properties of the waveform data of the Dub audio in order that edits made in the new aligned waveform do not introduce audible artefacts.

In the simplest case, a Line contains only uninterrupted original dialog from a single character in addition to the M&E audio. One example of the Guide audio in such a case was illustrated in FIG. 5 as Character Voice 1, audio stream 520. This Guide audio stream, if played with the Line's Video data (although this does not take place in this embodiment), would run synchronously with the corresponding Video data and be in sync with the image of the Character's lip movements.

The use of the alignment algorithm 830 in FIG. 8 will now be described with reference to FIG. 11. In this embodiment, the selected Line's edited Original Character audio 440 in FIG. 11 serves as the Guide audio and is accessed from data storage 1110.

In this embodiment, the Guide audio is pre-processed to extract the time-varying feature data and therefore data storage 1110 represents the disk storage 140 in computer 105b in FIG. 4. Because the Guide audio is not played during alignment in the User's PC, only the time-varying guide signal feature data 855 is required to represent the Guide audio during time alignment in the end-user computer program. Pre-processing during the media and program preparation phase is advantageous because it reduces the amount of audio data storage in the computer program image on removable media 165 in FIG. 4 and the processing required when the User runs the program. The elements involved in this optional pre-processing of the Guide audios are shown within the box with dashed lines 1150. The alternative to pre-processing, which is to implement the activities in 1150 in the User's PC 100 in FIG. 4, will be described later.

Figure 11:
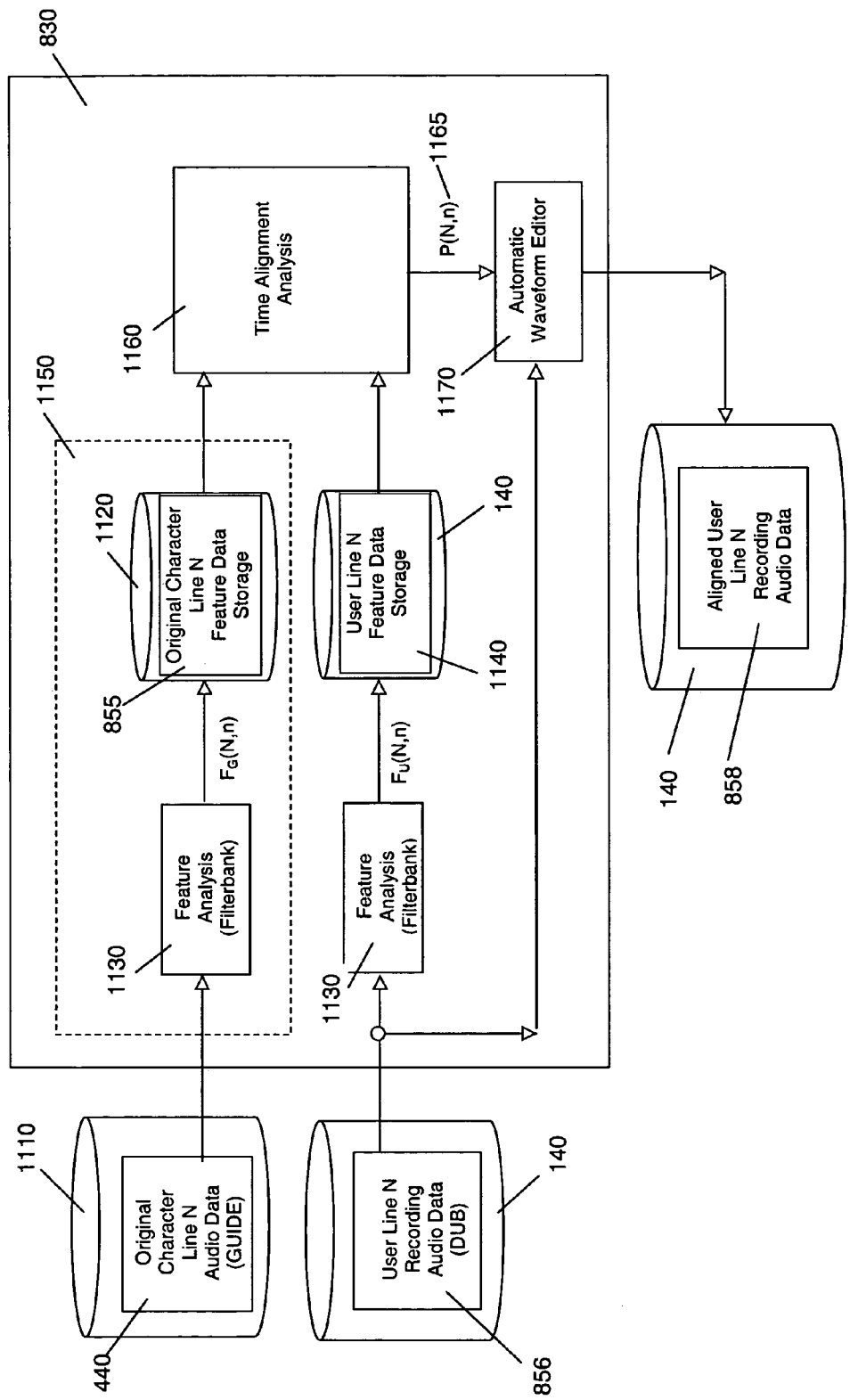
FIG. 11 illustrates in block form further details of elements in FIG. 8 which implement the Recording and Alignment Processing block 830 and create the Time Aligned version of the User's Recording according to one embodiment of the present invention.

In one example of pre-processing, the Media Preparation Editor initiates the computer-based processing of the digitized version of the first Line "I am the first," shown as the first hatched block in stream 520 in FIG. 5, as Original Character Line N of audio data 440 in FIG. 11. This digital audio stream is first put through a Feature Analysis computer program 1130, implemented in this embodiment by a 4 band digital filterbank (with octave-wide bands starting at 250 Hz, 500 Hz, 1000 Hz and 2000 Hz) and sampling the measured 4 band audio spectrum every 10 ms (as described in U.S. Pat. No. 4,591,928). The output from this analysis of the Guide audio is $F_G(N,n)$ where G represents Guide, N indicates line N, and n is the n-th 10 ms analysis time frame n, where n starts at 0. The analyzed data is stored as data file 855 in the system's data storage 1120 for that Programme, along with the other previously discussed Media Related Data including Guide signal identification, Line text data and the GUIDE_START and GUIDE_STOP timing information measured manually by the Media Preparation Editor as indicated by Media Related Data 430 in FIG. 4. Data storage 1120 can either be in the Data Storage 140 in PC 105b if pre-processed or in Data Storage in the User's PC 100 such as in RAM or Hard Disk 140.

In a further embodiment, if the program and data in storage 140 FIG. 4 are compiled into a binary form, the pre-processing to create the feature analysis data as described above can be automated to take place during the compilation phase in PC 105b, using the XML data to define the file name and the extent of the audio within the file to be pre-processed, based on the Guide-related data entered into the XML file by the Media Editor.

Whether the Guide audio is pre-processed or not, the majority of the alignment process occurs in this embodiment after the completion of the digital recording of the user's version of Line N 856 as described hereinbefore with references to FIGS. 10 and 8. The Main Program 820 in FIG. 8 controls the alignment processing module 830 in cooperation with the database management module 828, which controls the access of the required media and the storage of the processed results.

The digital waveform data for this user's audio recording plus its stop- and start-time information are stored in Data Storage 140 as a block 856 in FIG. 11. Alternatively, other forms of Data Storage such as RAM in the User's PC can also be used. Once all or even a portion of the digitized User's audio data becomes available, it can be processed by the same or identical Feature Analysis computer program 1130 as that used on the Guide audio. A program 1130 corresponding to the Feature Analysis computer program 1130 therefore forms part of the recording and alignment processing module 830 shown in FIG. 8.

The additional time variables DUB_START and DUB_STOP (measured and logged as data by the Media Editor as previously described), are supplied by the database management module 828 from Scene and Line Data 854 in storage 850, to the Recording and Alignment Processing module 830 in FIG. 8 to select the range over which to process the User's recordings instead of using the Line's STARTTIME and STOPTIME variables, which may have been set to occur somewhat before and after the Guide audio of the Line. Normally DUB_START is set slightly ahead of SPOT_TIME (say, by 0.2 seconds), and DUB_STOP is normally set to the Line's STOPTIME. The values of GUIDE_START and GUIDE_STOP are provided to the Recording and Alignment Processing module 830.

The time varying feature data streams for Line N from the selected ranges of the Guide, $F_G(N,n)$ and the selected range of the User Recording, $F_u(N,n)$, are processed by a digital Time Alignment Analysis program 1160 (described in U.S. Pat. No. 4,591,928) to create a time alignment path $P(N,n)$ 1165, where n is again the feature stream sample time. The sampling period for n used here is 0.01 second. The alignment path data $P(N,n)$, which defines the time distortion that must be applied to the selected range of the User Recording 856 to make its measured time-varying features best match those of the Guide audio 440, is input to an Automatic Waveform Editing program module 1170 which operates in the manner described in U.S. Pat. No. 4,591,928. The Time Alignment Analysis program 1160 and the Automatic Waveform Editing program module 1170 are further parts of the Recording and Alignment processing module 830.

The function of the Automatic Waveform Editing module 1170 is to edit the User's Audio Recording 856 of Line N and time-compress or time-expand the audio signal waveform where it is required according to P(N,n) 1165, but with the added condition imposed that each edit used to create the output waveform is made pitch synchronously wherever the signal has a measurable pitch at the joining point. Put another way, when cutting out or repeating a section of the original User's waveform to time compress or expand it respectively, the module 1170 analyses the signal waveform at the proposed cut and splice points and adjusts the edit point to ensure that the end of a signal block joins the beginning of the next non-contiguous signal block at a point which best aligns the two waveform's phases in order to not introduce audible artefacts. Further details of this process are available in U.S. Pat. No. 4,591,928 or in papers on time-scale modification of speech in Speech Enhancement, edited by J. S. Lim, Prentice Hall, 1983. Other methods of time distorting an audio signal waveform or analysis and resynthesis techniques may be used to create the required time-aligned waveform.

The resulting, time-aligned digital audio User Recording data is then stored, along with associated data defining the timing of the start and end of the new audio, as a waveform data file 858 in digital storage 140. The file 858 and other such files are represented collectively as Takes 858 in FIG. 8.

The preceding example describes the simple situation when there is a single Character's audio stream contained in the Line. In a more complex situation, as illustrated in FIG. 5, when the Dialog stream 530 of a second Original Character overlaps with the first Character, a separate data file can provide the second Character's Original Dialog stream. This second stream will also have a Line STARTTIME defined relative to the start of the video, but to avoid having large amounts of zero value audio data, the STARTTIME of this second stream can be combined with a non-zero offset time variable which is measured relative to the start of the Video Data in order simply to use less data storage space. The audio stream of the second Character can be treated the same as that of the first, using simple arithmetic to add the offset value to compute the starting point for data access and processing.

For simplicity, it has been assumed that during the Recording phase the user reads and records the words in the script correctly, but does not achieve perfect sync with the Original Character's voice in the original dialog audio and the corresponding lip movements. It is also assumed that, in the event the user makes a substantial error in reading the text, the user will stop and make further attempts until he gets it essentially correct apart from timing. If, however, there is an error in the reading, or the user records words different from those in the script, and the audio alignment algorithm achieves results similar to that aimed for in the algorithm in U.S. Pat. No. 4,591,928, then it is likely that significant time-varying features of the Replacement audio will still be aligned to other significant time-varying features of the original audio, thereby providing some level of lip-synchronization.

Lastly, it should be clear that pre-processing the Guide audio is not required or even always possible and, in alternative embodiments of this invention, the Feature Analysis of the Guide audio can take place at the same time as the feature analysis of the Dub audio which can be during or after the Recording pass. In particular, pre-processing would not be feasible in circumstances where the Guide audio is not pre-determined.

For example, one instance of this is a further embodiment in which the programme 450 in FIG. 4 is provided without the audio/video Media to be revoiced and the user can select the media to be revoiced. In this embodiment, the User can apply the revoicing methods and apparatus described herein to digital audio/video media that has the appropriate characteristics to allow it to be analysed by computer-based digital signal analysis techniques to extract the information required to create the data used for revoicing as described in this invention. Such analysis and data creation is feasible using known techniques including speech recognition and timing measurement (to automate the manual transcription and text entry step), extraction of voice signals from noise or unwanted background audio when necessary (to create Guide audio), and removal of voice signals from background audio or generation of background audio music and effects by synthesis or other techniques (to create replacement M&E tracks).

Such procedures could be applied, as an example, to certain films or music videos on DVDs, in which there are often multiple audio tracks that could be separately analysed to improve the quality and effectiveness of the Guide audio extraction and removal, speech to text generation, and provision of background audio without voice during playback stages. Similar procedures could be applied to other digital audio/video media carriers.

Similarly, the individual steps in the processing steps described above could be distributed between the User's PC and other computers, for example, a program based on a server on the Internet.

In other embodiments, in cases where either or both speech to text transcription or background audio replacement are not feasible, the revoicing process can still be applied in its most basic form by analysing the available Guide audio (including background signals if present) for alignment purposes only, creating the aligned User's recording, and playing only the aligned User's audio with the Video, but without any background Music and Effects audio. In other words, it is preferable but not absolutely essential to provide highlighted text and recreate the audio background present in the original audio/video programme as part of the revoicing process.

Playback of the Replacement Aligned Audio

There are three main modes of Playback using the Aligned audio that the user can initiate via Commands Play, Play Scene and Play All in the User interface 320.

FIG. 12 illustrates schematically what takes place in response to a Play Scene command but also contains the events in a simpler Play Line function. FIG. 12 again illustrates the relationships between the same data sources, Media files and Output Devices that were described in FIG. 10 for the Record Pass, but provides the elements of a simple Scene containing two Aligned User Recordings 1270 and 1271 as the available media for output. How these various media files are combined during the playback phases will be described next.

Play Line

If the User selects Line N via the Line Selector 350 in the User Interface 320 (FIG. 3) and clicks the Play button 363, this initiates the Play Line function. During Play Line, the sequence of events results in the User hearing a single Aligned User Recording 1270 (FIG. 12) of Line N played back simultaneously with the Original Video 910 and M&E 1030 tracks, but without the original dialog contained in the Full Mix 920. The detailed events are as follows.

Following the user activating the Play control 363, the Command Interpreter module and main program 820 in FIG. 8 accesses the Database Management module 828 to obtain from storage 850 the same media, text and timing data for the selected Line N as in the recording phase. Next, module 824 in FIG. 8 computes from Line N's data for $T_{STARTTIME}(N)$ (FIG. 12) the times at which to begin playing the Original Video 910 and the Full Mix audio 920 data streams in sync via module 840. A Full Mix Signal Gain control signal 930 is applied to the Gain control software multiplier 1026 as a gate on the Full Mix audio 920. This allows any audio before the replaced audio to be heard via the software mixing device 1028, which is implemented in DirectShow in module 840, and which sums the incoming audio signals and feeds the summed signal to the Audio Output 152 through the Output Audio Processor module 818 in FIG. 8, not shown in FIG. 12.

The Aligned User Recording for Line N 1270 in FIG. 12 is retrieved from storage 850 in FIG. 8 by the database management module 828 and played through the module 840 starting from the stored timing data $T_{SPOT\text{-}TIME}(N)$, and at a corresponding time (plus any additional amount of samples required to allow the fade-in and fade-out to take place), two Gain Control signals 1040 and 1280 for the M&E track 1030 and the Aligned User Recording 1270 respectively, are ramped up to 1.0 to let these signals be mixed and heard via the audio output 152. At the same time that 1040 and 1280 are ramped up to 1.0, the Full Mix Gain 930 is ramped to 0.0 and thereby turned off. When the Aligned User Recording stream 1270 comes to an end, the Gain Control signals 1040 and 1280 for the M&E stream 1030 and Aligned User Recording 1270 respectively ramp back to 0.0, and the Gain Control signal 930 for the Full Mix 920 (which has continued to run in sync) ramps up to 1.0 allowing this track to be heard again. In this embodiment, the Gain Control ramps provide a fade-up or fade-down of 10 ms in length at the transitions to ensure a smooth crossover. At the calculated switching times such as $T_{SPOT\text{-}TIME}(N)$, the gain control ramps are at a value of 0.5. Thus, for switchover calculated at a switching time $T_{SWITCH}$, the gain transitions are calculated to start at $T_{SWITCH}-5$ ms and to stop at $T_{SWITCH}+5$ ms as indicated schematically in FIG. 12.

The Full Mix and M&E signals 920 and 1030 are edited by the Media Preparation Editor to sufficient sample accuracy to ensure that both the M&E signal waveform contained in the Full Mix signal and the separate M&E signal waveform are phase locked, ensuring that the summed output of the mixer 1028 does not contain phase cancellations creating artefacts in the audio output.

Play Scene

The Play Scene phase allows the user to hear a sequence of Lines with Aligned User Recordings when available in context with the Video, the M&E audio and, when no User Recording is present, the Full Mix with the Original Voices.

The User Interface 320 in FIG. 3 allows the user to record one or more Takes 371, 373, 374 for each of the Lines such as line 353 in the Scene. The Database Management module 828 in FIG. 8 keeps track of the last user-Selected Take for each Line and loads and controls sequential playing of the Selected Takes during a Play Scene operation, which is initiated by the user clicking on the Play Scene button 344 of the interface 320. If a Line in a Scene has not been recorded and the Take Selector points to an "empty" (i.e. unrecorded Take), or the user has clicked on Take 372 to select the Original Voice Recording as the Selected Take for a specific Line, then the Command Interpreter and Main Program 820 will play the Original Voice Recording 372 for that Line.

FIG. 12 shows schematically the timing of events when the System in FIG. 8 assembles in sequence two Aligned User Recordings, shown as audio block 1270 for Line N and audio block 1271 for Line N+1 during the playback of the example Scene M between times $T_{SCENESTART}(M)$ and $T_{SCENESTOP}(M)$. Again, the Aligned User Recording Gain control signal 1280 is used to fade up to Gain=1.0 (i.e. ON) both the Aligned User Recordings and the M&E track when there is Aligned User audio present and ramp the Full Mix to Gain=0.0 (i.e. OFF) at these times, applying the cross fades as shown and described hereinbefore.

If a Scene has multiple Character Voices which sometimes overlap as shown in FIG. 5 at stream 520 and stream 530, then the modules 820 and 824 enable additional simultaneous streams of Aligned User Recordings such as the stream containing blocks 1270 and 1271 and corresponding Gain control signals such as the signal 1280 to be created during the Recording Phase, and all of the gated audio signals are summed at mixer 1028 in FIG. 12 to form the audio output that heard via the Audio Output device 152 during a Play Scene phase. At areas of multiple overlapping User Recordings, the module block 840 in FIG. 8 maintains playback of simultaneous synchronized audio streams and has more than one User Recording Gain ON at 1.0.

Apart from the use of a different start and stop time, and possible multiple Aligned User Recording audio streams with overlapping being controlled in parallel, any remaining details of the Play Scene command are essentially the same as the Play Line phase previously described.

Play All

When the user selects the Play All button 346 in FIG. 3, the module 824 in FIG. 8 will initiate a sequence of Play Scene commands starting with Scene 1 (or alternatively from any particular Scene selected in the Scene Selector 340) and continuing playing through all of the Scenes shown in the Scene Selector 340. During the playback of each Scene, as described previously in the Play Scene phase, Selected Takes are used for each successive Line in each Scene. Following selection of the Play All button 346, the system in FIG. 8 will continue playing Scenes in this embodiment until the user presses the keyboard Stop command (i.e. the spacebar) or playback of the last Scene is completed.

Depending on the type of media, the Play All command can utilize a further higher level of structured data organization such as a "Song" or "Movie" which includes data describing which Scenes are contained in that Song or Movie. Playing a Song or Movie, as a "Play All" function, would initiate the contiguous playback of all Scenes in that structure sequentially and consequently this would trigger the sequential playback of each successive Line in each Scene with the Lines' Selected Takes.

In the present embodiment, Play All is only available if the Scenes all come from a single continuous video file, but such restrictions may be removed in further embodiments. In a further embodiment (not shown here), it is possible to arrange for a higher level of audio organization: for example, a sequence of Songs or Movies to be played back similar to a "juke box".

Detail of System Data Processing Operations During Playback

Reference will now be made again to FIG. 8 and especially to the module 824 and module block 840 which create the audio streams for playback in both the record and playback operations.

Lines are the smallest element that can be selected for Playback and are the "building blocks" for all other forms of Playback and Recording. For every Line in a Scene, the Database Management module 828 maintains dynamically a data array of Takes including, among other data, references to the file names for each Aligned User Recording as well as data specifying which one Take is the Selected Take for playback.

Once the user has recorded Lines, as described previously, for each Line the User Interface 320 indicates which is the Selected Take for playback 371 by a graphical frame around it. The user can manually make any one of the available Takes for a Line, including the original character's recording, the Selected Take.

For each Scene, the Database Management module 828 dynamically maintains and accesses data which includes the array of Lines and Takes associated with that Scene.

In any Play command, the application module 824 in FIG. 8 will receive an instruction specifying whether it is to output a single Line (with its Selected Take), or a Scene (containing at least one Line), or a Song or Movie (containing one or more Scenes) or other higher level collection of Songs or Movies. In any of these cases, the application module 824 will go through the lists of data structures associated with the request and ultimately Line by Line construct a list of all the requested Selected Takes. The required static data defining the timings and media file names are obtained from the data structures on the CD/DVD ROM 165 FIG. 4 that were created from the original XML data files, and other dynamically-created data related to the User Takes created and maintained by the database management module 828 in FIG. 8.

Figure 13:
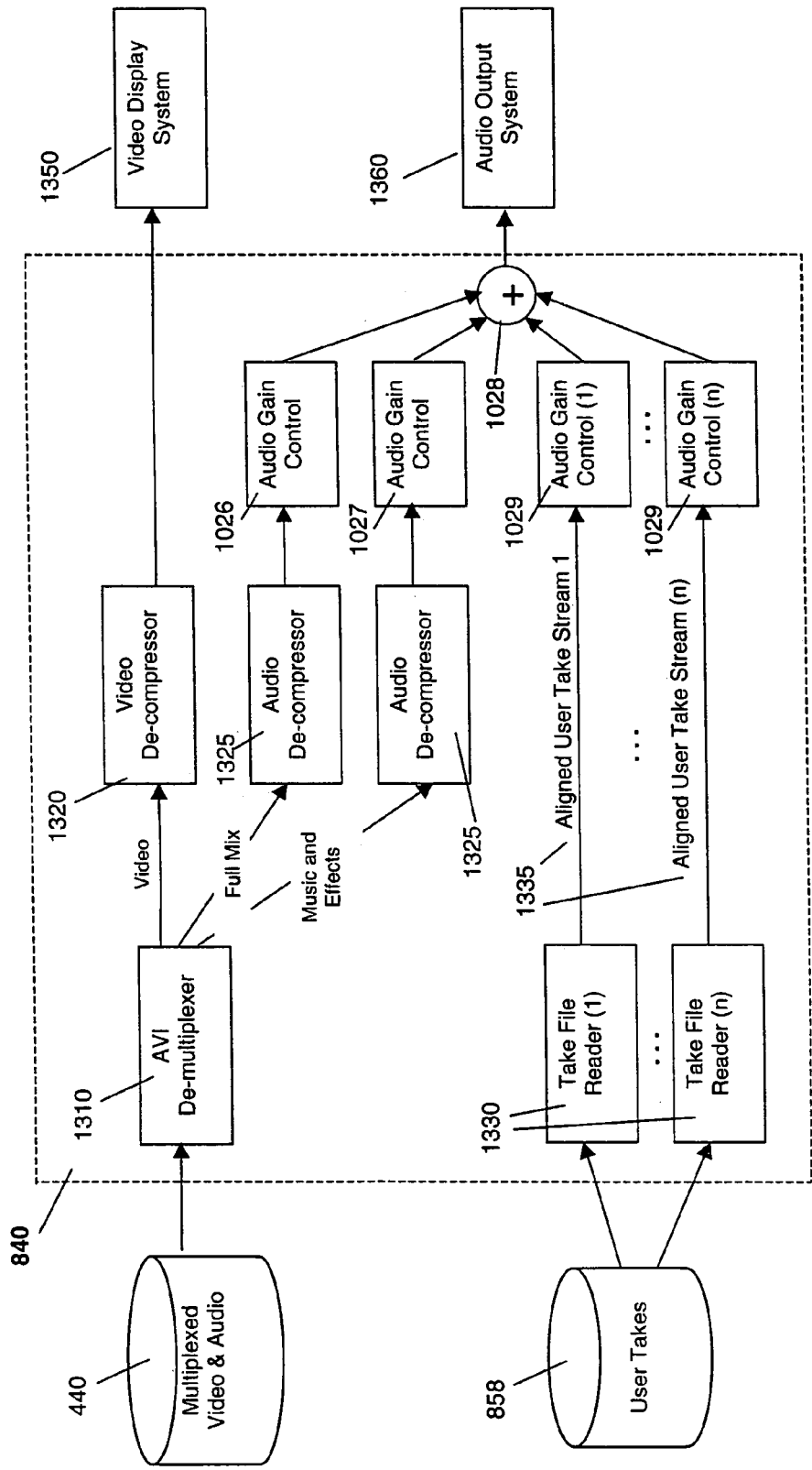
FIG. 13 illustrates in block form further details of the data stream processing which takes place in the block 840 in FIG. 8 during Scene and Line playback according to one embodiment of the present invention.

During the playback list construction process, the filenames of Takes are passed to one or more Take File Reader modules 1330 shown in FIG. 13. A Take File Reader module 1330 is an application specific program which, in the present embodiment maintains a list of user Take files to be played, accesses the appropriate files, and then streams the audio data into the next module (as will be described further below) when the associated pre-calculated time slots occur. The Take File Reader modules 1330 are created by the application program module 824 and function as an active buffer between the Data Storage 850 and Media Stream Creating modules in the module block 840.

A Take File Reader 1330 works as follows. Prior to playback, if a Take selected for playback has an associated data file which exists, as described above, module 824 adds the appropriate data to the list of Takes to be played by a Take File Reader.

During playback, a Take File Reader 1330 creates a single continuous Aligned User Take Audio Data Stream 1335. Before playback, the module 824 examines the Start and End Times data of each Selected Take that is requested and, if the start or end times for a playback request would cause one Take to overlap another Take in time, deploys an additional instance of another Take File Reader to provide a parallel Take data stream.

The module 824 creates and deploys the minimum number of Take File Readers 1330 that will allow all Selected Takes to be played at the required times under the constraint that each Take File Reader can only play Takes sequentially (i.e. without overlaps). The use of multiple Take File Readers 1330 illustrated in FIG. 13 is used in this embodiment to support the required overlapping (parallel) playback. Other mechanisms for playback could be devised to achieve the same result.

Once the request to Start playback is received, the name of the selected Take is passed to a Take File Reader 1330. The Take File Reader uses Operating System function calls to read out a stream of digital samples from the Take file and to put this data into a format suitable for DirectShow data streams in module block 840.

Those skilled in the art will understand that the process described is implemented as a demand fed output system. When a Take File Reader 1330 is instructed to supply data to the next module in line, the Take File Reader 1330 reads the number of samples that have been processed and, for each sample that has been asked for, the Take File Reader tests whether a file exists with the data required to fill the request. If the data exists, the Reader 1330 supplies the request with data and counts samples until it reaches the end of the file's data. When there are no more samples, the module sends an End of Stream message to the Direct Show filter object and when all active streams have sent this message, the application module 824 terminates the playback function.

If, in order to fill a downstream request for data, a Take File Reader 1330 is left without Take audio data for any duration, then the Take File Reader will supply digital zero data and keep the stream running in sync and ready to inject and output Take data at a later time. At these times when there is no Take data required during a playback request, the application module 824 instructs the module 840 to revert to playing back the original Full Mix data or the Music and Effects track as appropriate to the specific playback mode.

The same mechanisms for creating and outputting demand driven data streams are also used for the Video data, the Full Mix and the Music & Effects audio streams accessed in FIG. 13 from the Multiplexed Video & Audio storage 440. Here, the media data is shown as multiplexed in this embodiment, which is an optional matter, but is advantageous for efficient data access and streaming.

The AVI De-multiplexer 1310 reassembles the individual media data streams. The resulting compressed Video goes through a Video De-Compressor 1320 before being output to the Video Display Software and Hardware 1350 (incorporating both 816 and 130 in FIG. 8). The resulting Full Mix and Music & Effects audio pass through separate audio decompressors 1325 before being streamed through their individual Audio Gain Controls 1026 and 1027, and being summed in 1028 with any User Take audio. The summed audio stream from 1028 is output through Audio Output system 1360 which includes modules Output Audio Processor Software 818 and Audio Output Hardware 152 in FIG. 8.

This process recreates the data streams shown schematically in FIG. 12 for Playback and, if the User Take data 858 and associated Take File Readers are not engaged, the remaining modules and data streams depict the Rehearse function.

A Direct Show filter object module in the module block 840 builds up a list of switching times from the lists of timing data originally provided in the XML program data file. When no Take is available, the instruction put into the list will switch the output audio data stream of the module block 840 back to the original dialog stream (i.e. the Full Mix audio data) at the correct time position for the appropriate length of time. As the list is built, the filter object module also pre-computes the times for gain values to change for each stream's Audio Gain Controls and enters these values into a further lists to drive the Gain control signals shown in FIGS. 9, 10, and 12.

Detail of System Data Processing Operations During Recording

Figure 14:
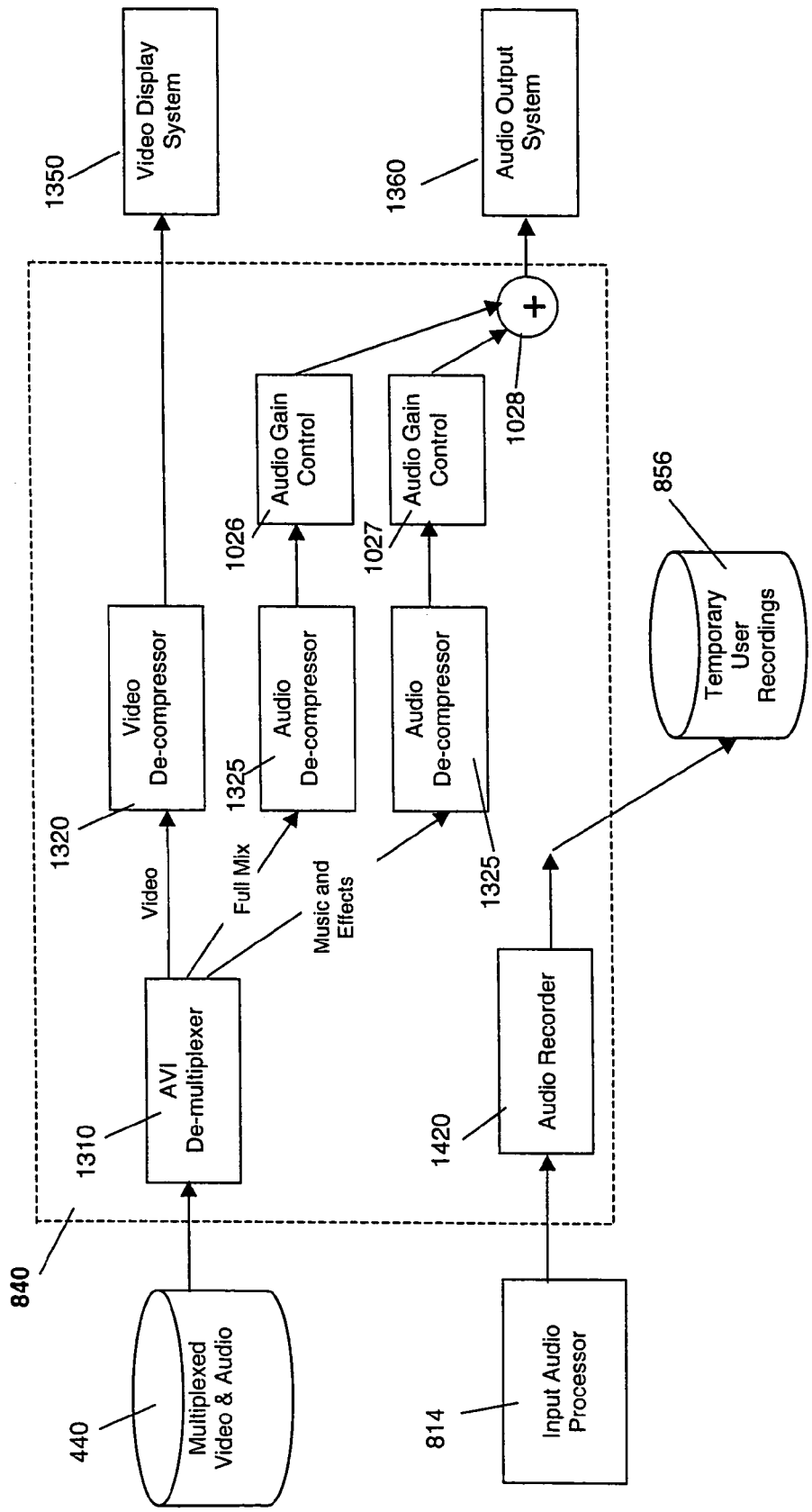
FIG. 14 illustrates in block form further details of the data stream processing which takes place in the block 840 in FIG. 8 during the recording of a Line according to one embodiment of the present invention.

During the Recording of a Line, module block 840 is configured slightly differently to its configuration during Playback as just described. The difference is shown in FIG. 14 where the Audio Recorder module 1420, receiving data from the Input Audio Processor 814 and creating Temporary User Recordings 856, replaces the User Take playback processing modules shown in FIG. 13. The Video and Audio output stream processing in the upper portion of FIG. 14 however is identical to FIG. 13 and the description above for these modules and data streams in FIG. 13 also applies here.

Clocking and Synchronization of Output Media

The audio output hardware 152 in FIG. 8 provides the clocking of the media during both Record and Playback operations and creates a demand driven chain from the hardware 152 back through all the other audio media data handling modules and processes.

When a command to start outputting is received in the application module 824, the final output module for each type of media asks for sufficient data to fill an input buffer of that output module. The individual modules in the chain before the last module do not need to know the current output "time". Each module in the chain only responds to and fulfils requests for supplying the type of data that the module handles.

All of the modules responding to data requests independently count the number of samples being passed onward to the next module in the output sequence chain in order to determine if they need to request more data from downstream or not. This includes the Video data in addition to the Take audio data, and the original Scene audio with and without the dialog (Full Mix and M&E).

Prior to the output of media related to one or more Lines, when a Start Playback or Record request is received, buffers in the module block 840 that feed the output sub-modules 816 and 818 are filled with the required audio and video data by Direct Show operating system modules in the module block 840.

The video and audio output data synchronization is handled in this embodiment by the so-called Operating System modules implemented by Direct Show within the module block 840. These OS modules also implement the system buffering and output requests. Other modules in the module 840 are clients of Direct Show. Direct Show functions and operation are described in the DirectX SDK (Software Development Kit) which is provided and documented by Microsoft, Inc. and in other publications.

The method and apparatus described hereinbefore provide for an untrained user a single integrated, simple system which: allows a member of the general public to replace the voices of characters or singers that accompany a video clip with their own voice, which is automatically processed and placed during playback such that it is accurately synchronized with displayed lip movements.

We claim:

1. An audio and video data processor, comprising a non-transitory computer readable medium having thereon:
    a selector for selecting from a first audio data stream at least a portion thereof, said first audio data stream being synchronized with corresponding visual events in a moving picture video data stream;
    an audio feature analyzer for abstracting from said selected portion of said first audio data stream a stream of time-varying features representative of time-varying acoustic features and for abstracting corresponding time-varying features from an input second audio data stream;
    a timing analysis and waveform editing processor adapted to determine timing differences between said stream of time-varying features and said corresponding time-varying features and to utilize said timing differences to edit said input second audio data stream to produce an edited input second audio data stream having acoustic features aligned with the acoustic features of said selected portion of said first audio data stream; and
    a playback control module adapted to control running of said synchronized first audio data and video data streams with said edited input second audio data stream such that said edited input second audio data stream replaces said selected portion and is synchronized with said corresponding visual events in said video data stream.

2. A data processing system for audio and video data, comprising a non-transitory computer readable medium having thereon:
    digitized audio and moving picture video data for providing a first audio data stream synchronized with corresponding visual events in a moving picture video data stream;
    timing data representative of a plurality of selected times in a running of said synchronized first audio data stream and said video data stream;
    audio feature data for providing a data stream of time-varying features abstracted from at least a selected portion of said first audio data stream and representative of audible time-varying acoustic features;
    an audio feature analyzer for abstracting a corresponding stream of time-varying features from an input second audio data stream;
    a timing analysis and waveform editing processor adapted to determine timing differences between said streams of time-varying features and to utilize said timing differences to edit said input second audio data stream and produce edited input audio data having acoustic features aligned with the acoustic features of said selected portion of said first audio data stream; and
    a playback control module adapted to control running of said synchronized audio data and video data streams with said edited input second audio data such that said edited input second audio data replaces said selected portion and is synchronized with said corresponding visual events in said video data stream.

3. A data processing system according to claim 2, the non-transitory computer readable medium further comprising cueing data representative of timing of said selected portion of said first audio data stream.

4. A data processing system according to claim 2, the non-transitory computer readable medium further comprising additional digitized audio data for providing a further audio data stream started concurrently with said video data stream.

5. A method of providing a processing system for audio and video data, comprising the steps of:
    storing in a non-transitory computer readable medium digitized audio and moving picture video data for providing a first audio data stream synchronized with corresponding visual events in a moving picture video data stream;
    storing in the non-transitory computer readable medium timing data representative of a plurality of selected times in a running of said synchronized audio and video data streams;
    selecting at least a portion of said first audio data stream;
    abstracting from the selected portion of said first audio data stream, using a programmable processor executing computer-executable instructions, audio feature data for providing a data stream of time-varying features, said audio feature data being representative of audible time-varying acoustic features;
    storing the abstracted audio feature data in the non-transitory computer readable medium;
    storing in the non-transitory computer readable medium an audio feature analyzer for abstracting a corresponding stream of time-varying features from an input second audio data stream;
    storing in the non-transitory computer readable medium a timing analysis and waveform editing processor adapted to determine timing differences between said data stream of time-varying features and corresponding features abstracted from said input second audio data stream and to produce an editing input second audio data stream having acoustic features aligned with the acoustic features of said selected portion of said first audio data stream; and
    storing in the non-transitory computer readable medium a playback control module for controlling running of said synchronized audio data and video data streams with edited second input audio data from said processor such that said edited input second audio data replaces said selected portion and is synchronized with said corresponding visual events in said moving picture video data stream.

6. A method according to claim 5, further comprising the step of:
storing in the non-transitory computer readable medium cueing data representative of timing of said selected portion of said first audio data stream.

7. A method according to claim 5, further comprising the step of:
storing in the non-transitory computer readable medium additional digitized audio data for providing a further audio data stream started concurrently with said video data stream.

8. A method according to claim 5, wherein said timing data further comprises gain control data adapted to control audio gain at selected times during a running of said synchronized audio and video data stream to effect replacement of said selected portion.

9. A method of processing audio data, comprising the steps of:
providing an original first audio data stream synchronized with corresponding visual events in a moving picture video data stream;
selecting at least a portion of said original first audio data stream;
storing in a non-transitory computer readable medium an input second audio data stream substantially in synchronization with a portion of said video data stream corresponding to the selected portion of said original audio data stream;
abstracting from said input second audio data stream a stream of time-varying features of the input second audio data stream, said time-varying features being representative of audible time-varying acoustic features;
comparing, using a programmable processor executing computer-executable instructions, the abstracted stream of time-varying features from said input second audio data stream with a corresponding stream of time-varying features abstracted from said selected portion of said original first audio data stream and determining timing differences between said streams of time-varying features;
editing said second audio data stream utilizing said timing differences to produce edited input second audio data having acoustic features aligned with the acoustic features of said selected portion of said first audio data stream; and
running said portion of said video data stream with said edited input second audio data such that said edited input second audio data replaces said selected portion and is synchronized with said corresponding visual events in said moving picture video data stream.

10. A method according to claim 9, wherein more than one portion of said original first audio data stream is selected.

11. A non-transitory computer readable medium having thereon audio and video data processing software comprising:
a feature analysis program adapted to derive from audio data feature data representative of audible time-varying acoustic features of the audio data;
a comparison and timing program adapted to compare first feature data derived from first audio data synchronized with corresponding visual events in moving picture video data with second feature data derived from second audio data and to determine timing differences between the first and second feature data;
an editing program adapted to edit the second audio data in dependence upon said timing differences such as to provide edited second audio data in a synchronous relation to said first audio data; and
a streaming program adapted to synchronously output said video data and said edited second audio data while muting said first audio data whereby said edited second audio data replaces said first audio data and is synchronized with said corresponding visual events in said video data.

12. A method of producing an audio signal as a replacement for a pre-recorded audio signal synchronized with a pre-recorded video signal, the method comprising the steps of:
populating a database in a non-transitory computer readable medium with data representing the pre-recorded audio signal synchronized with the pre-recorded video signal, and data indicative of the timing of the pre-recorded audio signal relative to the pre-recorded video signal;
receiving and storing in the non-transitory computer readable medium an input audio signal having timing similar to that of the pre-recorded audio signal;
providing first feature data that is derived from the pre-recorded audio signal and encodes audible time-varying acoustic features of a predetermined type and the timing thereof within the pre-recorded audio signal;
providing second feature data that is derived from the input audio signal and encodes audible time-varying acoustic features of the predetermined type and the timing thereof within the input audio signal;
determining timing differences existing between the first feature data and the second feature data;
altering the timing of the acoustic features of the stored input audio signal to match the timing of the corresponding acoustic features of the pre-recorded audio signal to produce thereby an edited replacement audio signal; and
selecting a start time for starting outputting of the edited replacement audio signal to coincide with a corresponding start time of the pre-recorded audio signal relative to the pre-recorded video signal and for starting muting of the pre-recorded audio signal.

13. A method according to claim 12, wherein said step of populating a database with data includes storing in the database the first feature data, and said step of determining timing differences includes retrieving the first feature data from the database.

14. A method according to claim 12 or 13, wherein said step of populating a database is performed in a first processing system, and said steps of determining timing differences, and altering the timing are performed in a second processing system.

15. A method according to claim 12, wherein the pre-recorded audio signal is any selected one of a plurality of pre-recorded audio signals synchronized with a pre-recorded video signal, and said step of determining timing differences includes selecting one of the plurality of pre-recorded audio signals.

16. A method according to claim 12, further comprising outputting the edited replacement audio signal while muting the pre-recorded audio signal.

17. An apparatus for producing an audio signal as a replacement for a pre-recorded audio signal synchronized with a pre-recorded video signal, the apparatus comprising:

one or more non-transitory computer readable mediums; a database populated with data representing the pre-recorded audio signal synchronized with the pre-recorded video signal, and data indicative of the timing of the pre-recorded audio signal relative to the pre-recorded video signal; means for deriving from the pre-recorded audio signal first feature data encoding audible time-varying acoustic features of a predetermined type and the timing thereof in the pre-recorded audio signal; means for receiving and storing an input audio signal having timing similar to that of the pre-recorded audio signal; means for deriving from the input audio signal second feature data encoding audible time-varying acoustic features of said predetermined type and the timing thereof within the input audio signal; means for determining timing differences existing between the first feature data and the second feature data; means for altering the timing of the acoustic features of the stored input audio signal to match the timing of the corresponding acoustic features of the pre-recorded audio signal and producing thereby an edited replacement audio signal; and means for selecting a start time for starting outputting of the edited replacement audio signal to coincide with a corresponding start time of the pre-recorded audio signal relative to the pre-recorded video signal and for starting muting of the pre-recorded audio signal.

18. An apparatus according to claim 17, further including means for populating the database with said first feature data.

19. An apparatus according to claim 17, further including means for populating the database with data from the pre-recorded audio signal synchronized with the pre-recorded video signal.

20. An apparatus according to claim 18 or 19, wherein the means for populating the database are located in a first processing system and the determining means and altering means are located in a second processing system.

21. An apparatus for producing an audio signal as a replacement audio signal for a pre-recorded audio signal synchronized with a pre-recorded video signal, the apparatus comprising: one or more non-transitory computer readable mediums; a database populated with data representing the pre-recorded audio signal synchronized with the pre-recorded video signal, and data indicative of the timing of the pre-recorded audio signal relative to the pre-recorded video signal; an audio system for receiving and storing an input audio signal having timing similar to that of the pre-recorded audio signal; a comparing unit deriving from the pre-recorded audio signal first feature data encoding audible time-varying acoustic features of a predetermined type and the timing thereof in the pre-recorded audio signal and deriving from the input audio signal second feature data encoding audible time-varying acoustic features of the predetermined type and the timing thereof within the input audio signal, and determining timing differences existing between the first feature data and the second feature data; an editing unit for altering the timing of the acoustic features of the stored input audio signal to match the timing of the corresponding acoustic features of the pre-recorded audio signal to produce thereby an edited replacement audio signal; and a timer for selecting a start time for starting outputting of the edited replacement audio signal to coincide with a corresponding start time of the pre-recorded audio signal relative to the pre-recorded video signal and for starting muting of the pre-recorded audio signal.

22. An apparatus for producing an audio signal as a replacement audio signal for a pre-recorded audio signal synchronized with a pre-recorded video signal, the apparatus comprising: one or more non-transitory computer readable mediums; a database populated with data representing the pre-recorded audio signal synchronized with the pre-recorded video signal, and data indicative of the timing of the pre-recorded audio signal relative to the pre-recorded video signal; an audio system for receiving and storing an input audio signal having timing similar to that of the pre-recorded audio signal; a first acoustic feature extracting unit for deriving from the pre-recorded audio signal first feature data encoding audible time-varying acoustic features of a predetermined type and the timing thereof in the pre-recorded audio signal; a second acoustic feature extracting unit for deriving from the input audio signal second feature data encoding audible time-varying acoustic features of the predetermined type and the timing thereof within the input audio signal; a comparator for determining timing differences existing between the first feature data and the second feature data; an editing unit for altering the timing of the acoustic features of the stored input audio signal to match the timing of the corresponding acoustic features of the pre-recorded audio signal to produce thereby an edited replacement audio signal; and a timer for selecting a start time for starting outputting of the edited replacement audio signal to coincide with a corresponding start time of the pre-recorded audio signal relative to the pre-recorded video signal and for starting muting of the pre-recorded audio signal.

23. A method of producing an audio signal as a replacement for a pre-recorded audio signal synchronized with a pre-recorded video signal, the method comprising the steps of:
populating a database in a non-transitory computer readable medium with data representing the pre-recorded audio signal synchronized with the pre-recorded video signal, and data indicative of the timing of the pre-recorded audio signal relative to the pre-recorded video signal;
receiving and storing in a non-transitory computer readable medium an input audio signal having timing similar to that of the pre-recorded audio signal;
providing first feature data that is derived from the pre-recorded audio signal and encodes audible time-varying acoustic features of a predetermined type and the timing thereof within the pre-recorded audio signal,
providing second feature data that is derived from the input audio signal and encodes audible time-varying acoustic features of the predetermined type and the timing thereof within the input audio signal;
determining timing differences existing between the first feature data and the second feature data;
altering acoustic features of the stored input audio signal to produce thereby an edited replacement audio signal such that the timing of the acoustic features of the predetermined type of the edited replacement audio signal matches the timing of the acoustic features of the pre-recorded audio signal; and
selecting a start time for starting outputting of the edited replacement audio signal to coincide with a corresponding start time of the pre-recorded audio signal relative to the pre-recorded video signal and for starting muting of the pre-recorded audio signal.

24. An apparatus for producing an audio signal as a replacement audio signal for a pre-recorded audio signal synchronized with a pre-recorded video signal, the apparatus comprising: one or more non-transitory computer readable mediums; a database populated with data representing the pre-recorded audio signal synchronized with the pre-recorded video signal, and data indicative of the timing of the pre-recorded audio signal relative to the pre-recorded video signal; an audio system for receiving and storing an input audio signal having timing similar to that of the pre-recorded audio signal; a comparing unit deriving from the pre-recorded audio signal first feature data encoding audible time-varying acoustic features of a predetermined type and the timing thereof in the pre-recorded audio signal and deriving from the input audio signal second feature data encoding audible time-varying acoustic features of the predetermined type and the timing thereof within the input audio signal, and determining timing differences existing between the first feature data and the second feature data; an editing unit for altering the acoustic features of the stored input audio signal to produce thereby an edited replacement audio signal having acoustic features of the predetermined type with timing matching the timing of the corresponding acoustic features of the pre-recorded audio signal; and a timer for selecting a start time for starting outputting of the edited replacement audio signal to coincide with a corresponding start time of the pre-recorded audio signal relative to the pre-recorded video signal and for starting muting of the pre-recorded audio signal.

25. An apparatus for producing an audio signal as a replacement audio signal for a pre-recorded audio signal synchronized with a pre-recorded video signal, the apparatus comprising: one or more non-transitory computer readable mediums; a database populated with data representing the pre-recorded audio signal synchronized with the pre-recorded video signal, and data indicative of the timing of the pre-recorded audio signal relative to the pre-recorded video signal; an audio system for receiving and storing an input audio signal having timing similar to that of the pre-recorded audio signal; a first acoustic feature extracting unit for deriving from the pre-recorded audio signal first feature data encoding audible time-varying acoustic features of a predetermined type and the timing thereof in the pre-recorded audio signal; a second acoustic feature extracting unit for deriving from the input audio signal second feature data encoding audible time-varying acoustic features of the predetermined type and the timing thereof within the input audio signal; a comparator for determining timing differences existing between the first feature data and the second feature data; an editing unit for altering the acoustic features of the stored input audio signal to produce thereby an edited replacement audio signal having acoustic features of the predetermined type with timing matching the timing of the corresponding acoustic features of the pre-recorded audio signal; and a timer for selecting a start time for starting outputting of the edited replacement audio signal to coincide with a corresponding start time of the pre-recorded audio signal relative to the pre-recorded video signal and for starting muting of the pre-recorded audio signal.

* * * * *